US012697915B2

(12) United States Patent
Rodriguez et al.

(10) Patent No.: US 12,697,915 B2
(45) Date of Patent: Aug. 4, 2026

(54) GATE FOR A VEHCILE

(71) Applicant: NISSAN NORTH AMERICA, INC., Franklin, TN (US)

(72) Inventors: Daniel Rodriguez, Farmington Hills, MI (US); Dale Butterworth, Brighton, MI (US); Mitsuyasu Hikosaka, Novi, MI (US); James Iwanski, Oxford, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 18/988,764

(22) Filed: Dec. 19, 2024

(65) Prior Publication Data

US 2026/0175771 A1     Jun. 25, 2026

(51) Int. Cl.
| | |
|---|---|
| B60P 3/42 | (2006.01) |
| B60J 5/10 | (2006.01) |
| *E05F 15/42* | (2015.01) |
| *E05F 15/77* | (2015.01) |

(52) U.S. Cl.
CPC .............. *B60P 3/423* (2013.01); *B60J 5/108* (2013.01); *E05F 15/42* (2015.01); *E05F 15/77* (2015.01); *E05Y 2400/532* (2013.01)

(58) Field of Classification Search
CPC ...................................................... B60P 3/423
See application file for complete search history.

(56) References Cited

U.S. PATENT DOCUMENTS

| | | |
|---|---|---|
| 6,276,751 B1 | 8/2001 | Ikarashi et al. |
| 6,416,104 B1 | 7/2002 | Fisher et al. |
| 6,419,299 B1 | 7/2002 | Pyo |
| 6,450,566 B1 * | 9/2002 | Hong ................... B62D 47/003 296/26.11 |
| 6,478,355 B1 | 11/2002 | Van Eden et al. |
| 6,481,772 B1 * | 11/2002 | Tenn ....................... B60P 3/423 296/65.01 |
| 6,513,863 B1 * | 2/2003 | Renke .................... B60P 3/423 296/57.1 |
| 6,742,834 B1 | 6/2004 | Marritt et al. |

(Continued)

FOREIGN PATENT DOCUMENTS

| | | | |
|---|---|---|---|
| DE | 102005062219 A1 | 7/2006 | |
| EP | 1234702 A1 * | 8/2002 | ............ B60J 1/1823 |

(Continued)

OTHER PUBLICATIONS

Everyday Chris, Did Tesla Make a Mistake? (GMC Sierra Denali EV Review), https://www.youtube.com/watch?v=dpJNQQwX3hM, 2024 siera, on Dec. 19, 2024.

(Continued)

*Primary Examiner* — Catherine A Kelly

(74) *Attorney, Agent, or Firm* — Spencer Fane, LLP

(57) ABSTRACT

A vehicle includes a cabin area, a cargo area, a gate and a latch receiver. The gate is disposed between the cabin area and the cargo area. The gate has a closed configuration disposed in an opening in a wall separating the cabin area and the cargo area and an open configuration disposed within the cabin area. The gate includes a latch. The latch receiver is disposed in the wall separating the cabin area and the cargo area. The latch receiver is configured to receive the latch to fix the gate in the closed configuration.

20 Claims, 25 Drawing Sheets

(56)    References Cited

U.S. PATENT DOCUMENTS

| | | | |
|---|---|---|---|
| 6,786,535 B1 | 9/2004 | Grzegorzewski et al. | |
| 6,796,600 B1 * | 9/2004 | Ferer | B60P 3/423 |
| | | | 296/37.6 |
| 6,837,529 B2 | 1/2005 | Kharod et al. | |
| 6,929,301 B2 | 8/2005 | Kim et al. | |
| 6,959,960 B2 * | 11/2005 | Buccinna | B60N 2/3031 |
| | | | 296/26.11 |
| 8,303,013 B2 | 11/2012 | Horiuchi et al. | |
| 9,097,045 B2 | 8/2015 | Hausler et al. | |
| 9,346,390 B1 | 5/2016 | Croswhite | |
| 9,797,180 B2 * | 10/2017 | Salmon | B62D 33/0273 |
| 11,731,549 B2 | 8/2023 | Bursch | |
| 11,926,248 B2 | 3/2024 | Bonk et al. | |
| 11,999,274 B2 * | 6/2024 | Grant | B60J 1/1884 |
| 12,195,101 B2 * | 1/2025 | de Salvi | B60R 21/026 |
| 2003/0122401 A1 * | 7/2003 | Hashimoto | B62D 25/087 |
| | | | 296/190.11 |
| 2004/0195888 A1 | 10/2004 | Frye | |
| 2009/0039675 A1 | 2/2009 | King et al. | |
| 2018/0072140 A1 * | 3/2018 | Azzouz | B62D 33/06 |
| 2025/0065960 A1 * | 2/2025 | Jung | B62D 33/03 |

FOREIGN PATENT DOCUMENTS

| | | | | |
|---|---|---|---|---|
| FR | 2898841 A1 * | 9/2007 | | B60J 1/1861 |
| WO | 2004/098983 A1 | 11/2004 | | |

OTHER PUBLICATIONS

SchwayZ_, 5 Reasons Why the H2 Hummer SUT is the Most Ridiculous Vehicle Ever Made!, https://www.youtube.com/watch?v=WEbIVTDSNuY, on Dec. 19, 2024.

Planet Car News, 2025 Fisker Alaska Reveal | $45,400 Tesla Cybertruck Rival, https://www.youtube.com/watch?v=z9AQztNWpms, on Dec. 19, 2024.

Truck King, Vinfast VF Wild Concept Is An All Electric Midsizer With a Trick Bed, https://www.youtube.com/watch?v=fwbfdwZ_Vw0, on Dec. 19, 2024.

* cited by examiner

GATE FOR A VEHCILE

BACKGROUND

Technical Field

The present disclosure generally relates to gate for a vehicle. More specifically, the present disclosure relates to gate for a vehicle that is disposed between a cabin area and a cargo area.

Background Information

Conventional gates that are disposed between a cabin area and a cargo area can be called mid-gates. These gates are generally disposed in "pick-up" trucks and allow the vehicle user to expand the length of the bed of the pickup by folding the gate and allowing access to the cab.

SUMMARY

It has been discovered that in conventional vehicles with a mid-gate, the gate can be difficult to deploy or are not flush or planar with the cargo area. These problems can make the mid-gate undesirable or difficult to operate.

In view of the state of the known technology, one aspect of the present disclosure is to provide a vehicle includes a cabin area, a cargo area, a gate and a latch receiver. The gate is disposed between the cabin area and the cargo area. The gate has a closed configuration disposed in an opening in a wall separating the cabin area and the cargo area and an open configuration disposed within the cabin area. The gate includes a latch. The latch receiver is disposed in the wall separating the cabin area and the cargo area. The latch receiver is configured to receive the latch to fix the gate in the closed configuration.

Another aspect of the present disclosure is to provide a method of latching a gate of a vehicle. The method comprises providing a gate between a cabin area of a vehicle and a cargo area of the vehicle, the gate having a latch and a closed configuration and an open configuration, providing a wall a wall separating the cabin area and the cargo area, the wall including an opening to receive the gate and a latch receiver, rotating the gate in a rearward direction of the vehicle so as to locate the gate within the opening, and receiving the latch in the latch receiver to fix the gate within the opening.

Thus, the present disclosure provides an improved gate disposed between a cabin area and a cargo area. The gate of the present disclosure can be deployed and removed in a user friendly manner and when deployed will provide a generally continuous flush surface from the cargo area into the cabin area.

Other objects, features, aspects and advantages of the disclosed gate for a vehicle will become apparent to those skilled in the art from the following detailed description, which, taken in conjunction with the annexed drawings, discloses exemplary embodiments of the gate for a vehicle.

BRIEF DESCRIPTION OF THE DRAWINGS

Referring now to the attached drawings which form a part of this original disclosure.

DETAILED DESCRIPTION

Selected embodiments will now be explained with reference to the drawings. It will be apparent to those skilled in the art from this disclosure that the following descriptions of the embodiments are provided for illustration only and not for the purpose of limiting the disclosure as defined by the appended claims and their equivalents.

Figure 1:
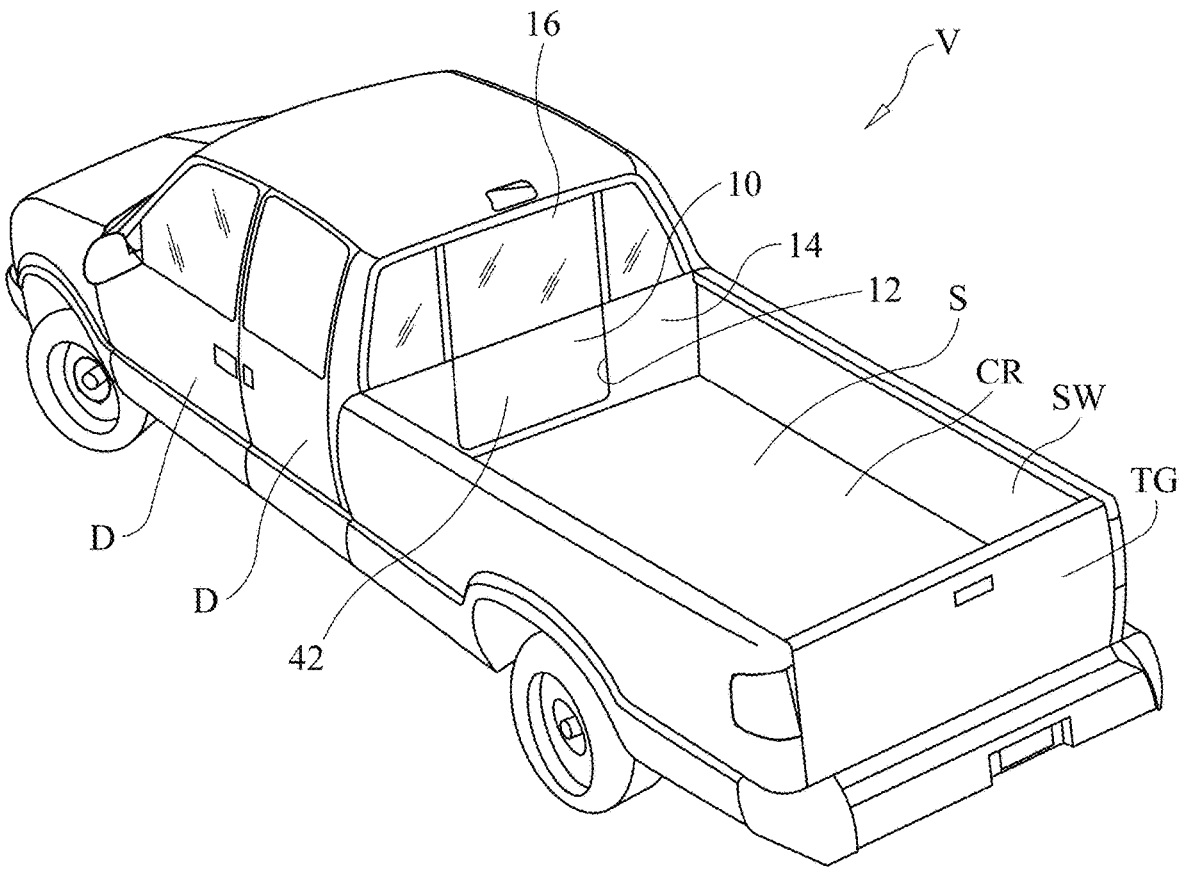
FIG. 1 is rear perspective view of a vehicle having a gate in accordance with an embodiment of the present disclosure in the closed configuration.
Figure 2:
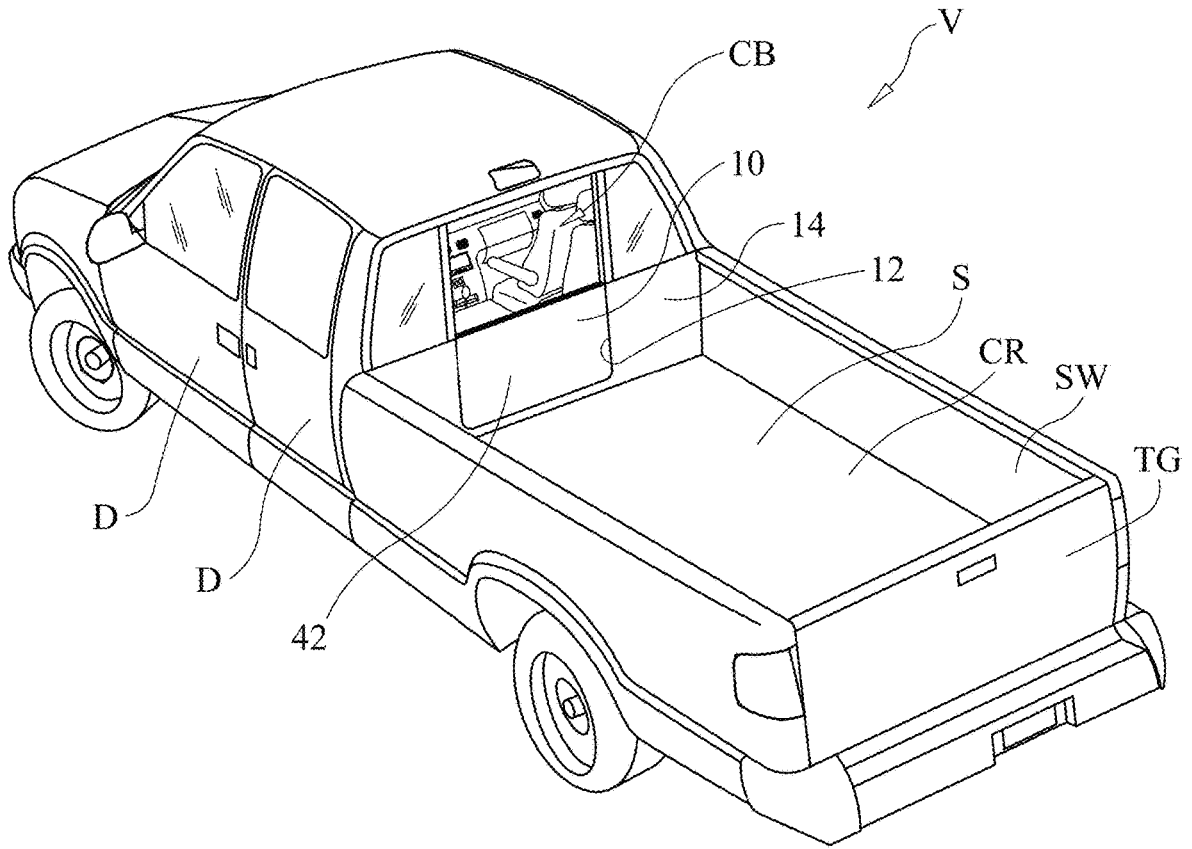
FIG. 2 is a rear perspective view of the vehicle having a gate of FIG. 1 with the rear window in an open configuration.
Figure 3:
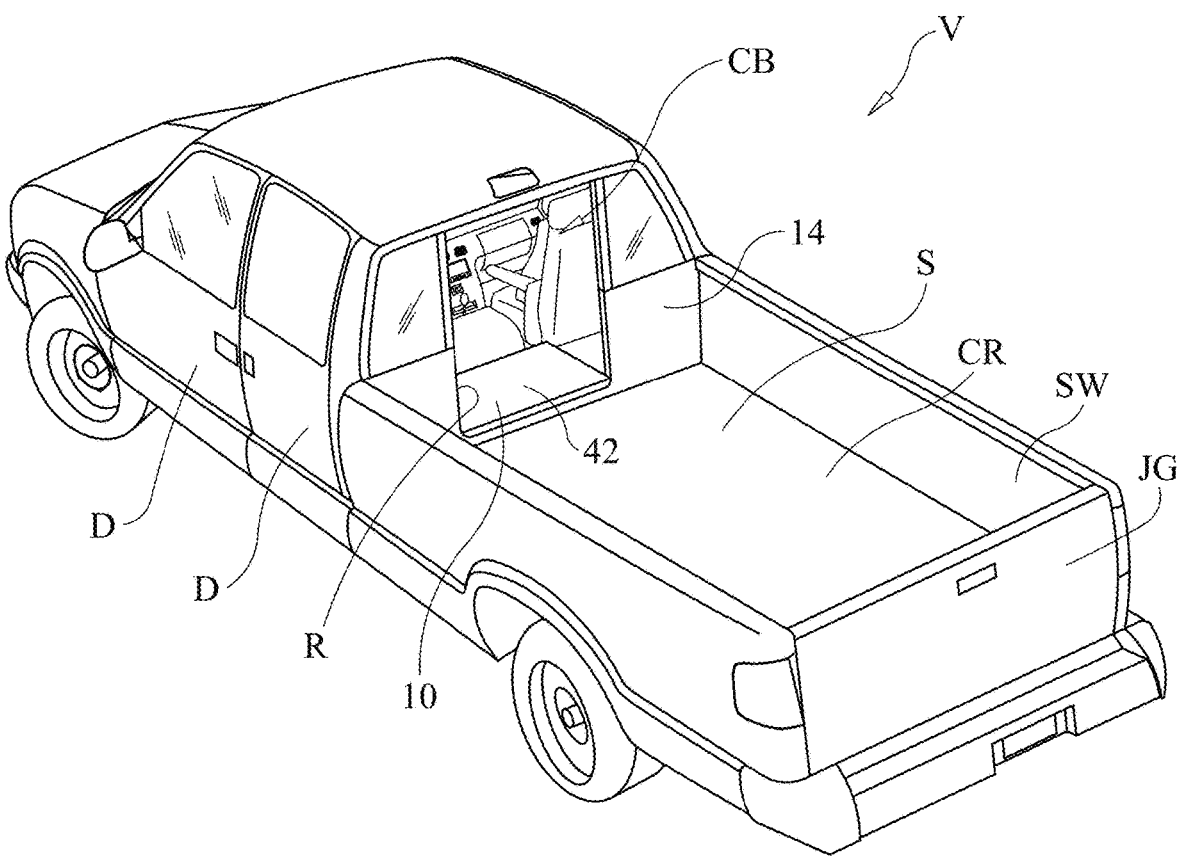
FIG. 3 is a rear perspective view of the vehicle having a gate of FIG. 1 with the gate in an open configuration.

Referring initially to FIGS. 1-3, a vehicle V with a gate 10 is illustrated in accordance with an embodiment. The illustrated vehicle V is a pick-up truck. However, as can be understood, the vehicle V can be any suitable vehicle, including but not limited to an a sport utility vehicle (SUV), a sedan, a hatch back or any other suitable vehicle. The vehicle V can include a cabin area CB, a cargo area CR, and a gate 10 disposed between the cabin area CB and the cargo area CR. The gate 10 is disposed within an opening 12 in a wall 14 that separates the cabin area CB from the cargo area CR. As illustrated, the gate 10 has at least a closed configuration (FIG. 1) and an open configuration (FIG. 3). Moreover, the gate 10 in this disclosure is generally considered a mid-gate, but the gate 10 can be any suitable gate and is not necessarily limited to a mid-gate.

As illustrated in FIG. 1, the gate 10 includes a window 16 (transparent member), and both the gate 10 and the window 16 are in the closed configuration. The gate 10, along with the wall 14 form a barrier between the cargo area CR and the cabin. The gate 10 can further provide additional configurations, including the gate 10 being in a closed configuration with the window 16 being an open or partially open configuration (FIG. 2) and the gate 10 and the window 16 being in an open configuration (FIG. 3).

As illustrated, the cargo area CR can be a bed for a pick-up truck. The cargo area CR includes a surface S, side walls SW and a tailgate 10. The cargo area CR is further bounded by the wall 14 at the front of the cargo area CR. The tailgate TG can be a conventional tailgate or any suitable tailgate or structure to bound the rear of the cargo area CR. Moreover, in some cases there does not necessarily need to be a tailgate TG or side walls SW. As can be understood, the cargo area CR can be a conventional cargo area CR and therefore further description thereof is not necessary.

Figure 4:
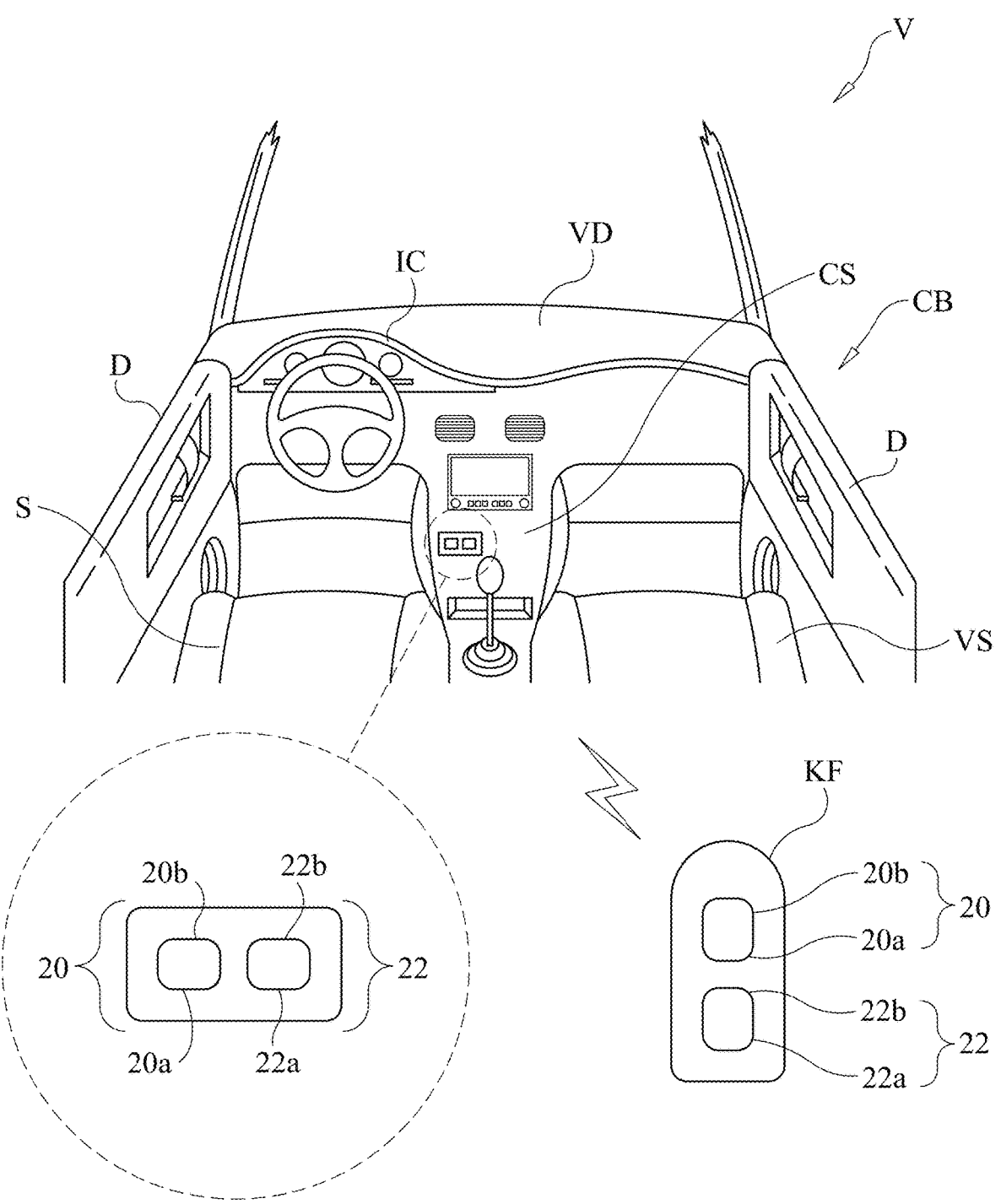
FIG. 4 is an elevational view of the instrument panel of the vehicle of FIG. 1 illustrating the switches for operation of the gate.
Figure 5:
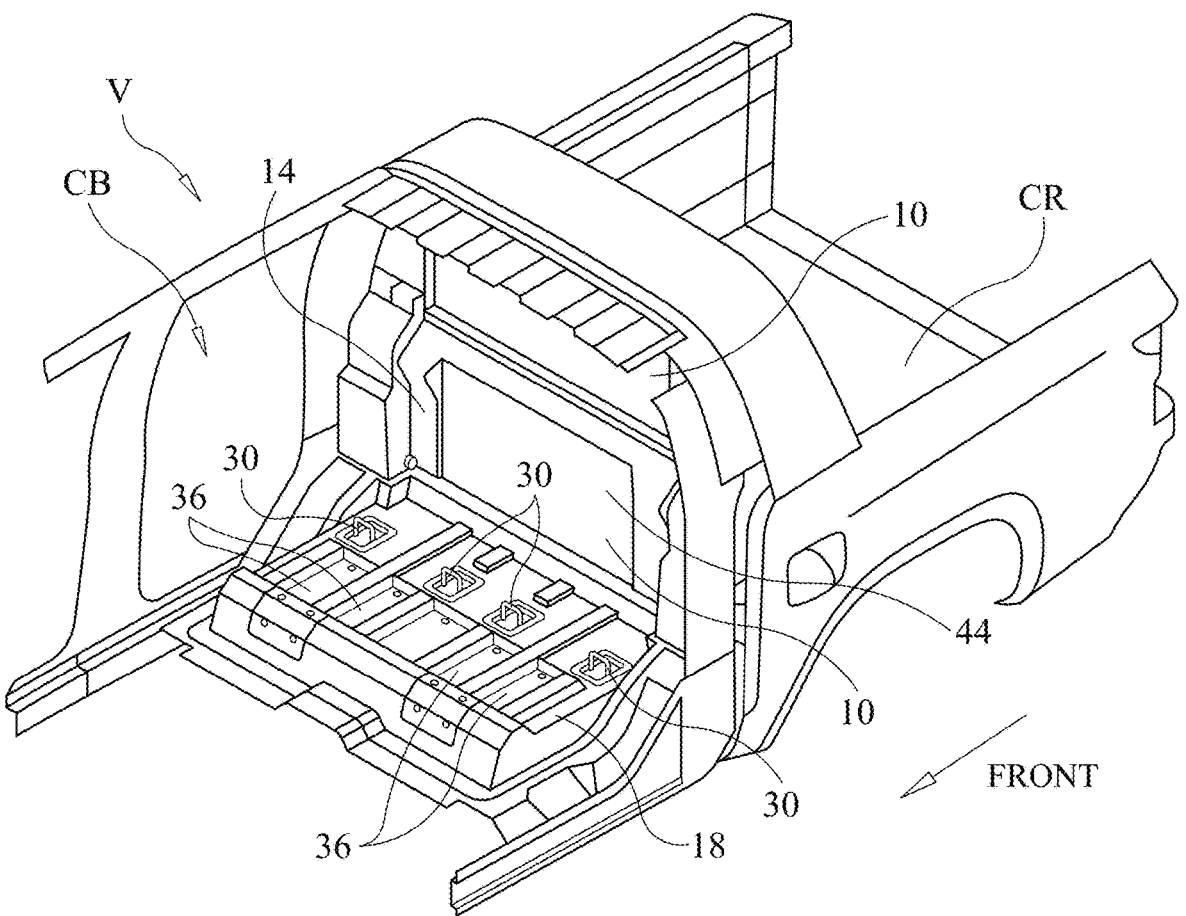
FIG. 5 is a partial perspective front view of the vehicle of FIG. 1 with the rear seat removed and the gate in a closed configuration.
Figure 9:
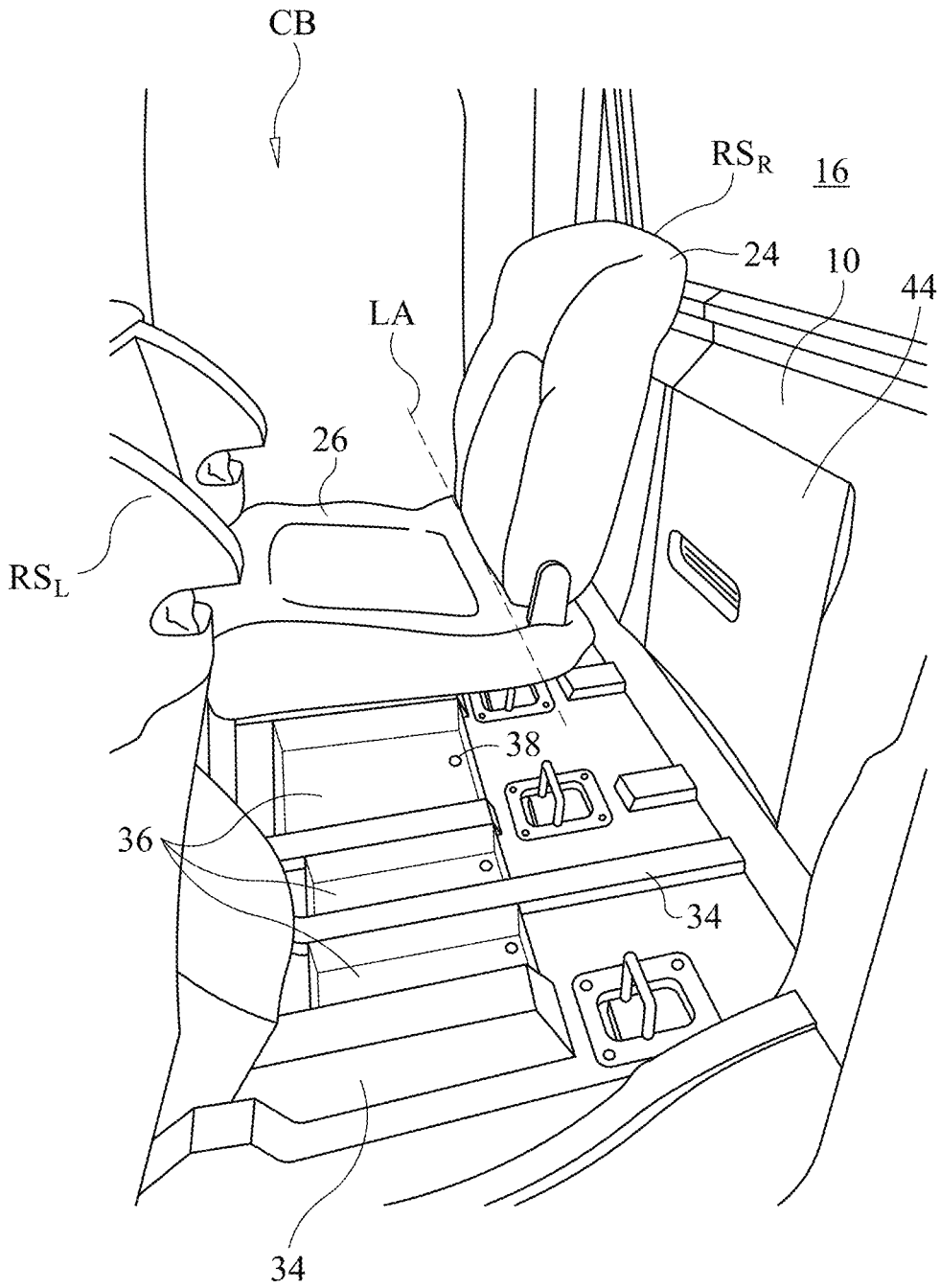
FIG. 9 is a view of the cabin area with one rear seat in a forward position, one rear seat in a seated position and the gate in a closed configuration.

The cabin area CB can be a generally conventional cabin area for a vehicle V. The cabin can be accessed in any conventional in manner. In the illustrated embodiment, the cabin area CB is accessed via the vehicle doors D. As can be understood, the left and right rear doors can access the rear portion of the cabin area CB and the left and right front doors can access the front portion of the cabin area CB. As illustrated in FIGS. 4, 5 and 9, the cabin can include a vehicle dashboard VD, vehicle seats VS and a floor 18. The vehicle dashboard VD includes an instrument cluster IC and a center stack CS. In this embodiment, the center stack CS includes a first button (electronic switch) 20 and a second button (electronic switch) 22. The first button 20 can enable the operation of the window 16 in the gate 10. That is, pressing a first portion 20a of the first button 20 can cause the window 16 to lower to transition from the closed configuration to the open configuration, and pressing a second portion 20b of the first button 20 can cause the window 16 to raise to transition from the open configuration to the closed configuration. It is noted that the first button 20 can be located in any suitable location within the vehicle V, and can be any suitable type of button, include a physical button or a digital button located on a screen.

The second button 22 can enable the operation of the gate 10. That is, pressing a first portion 22a of the button can cause the gate 10 to lower to transition from the closed configuration to the open configuration, and pressing a second portion 22b of the second button 22 can cause the gate 10 to raise to transition from the open configuration to the closed configuration. It is noted that the second button 22 can be located in any suitable location within the vehicle V, and can be any suitable type of button, include a physical button or a digital button located on a screen. Moreover, the gate 10 can be restricted or prevented from moving to the open configuration unless the window 16 is in the completely lowered or opened configuration.

The first and second buttons 20 and 22 can be combined into one button or can be separated into more than two buttons. In another embodiment, the first and second button 20 and 22 can be a remote wireless button (for example, a button on a key fob KF) that operates the gate 10 and/or window 16 in a remote wireless manner. The wireless transmission can occur using a wireless system desired, including emission or a radio frequency, near filed communications or any suitable wireless communication system. Further, as can be understood, the first and second buttons 20 and 22 (or additional buttons) can be located on a separate wireless device, such an app on a handheld device, e.g., as a smart phone, a tablet, a computer or any other suitable wireless or wired device.

Figure 12:
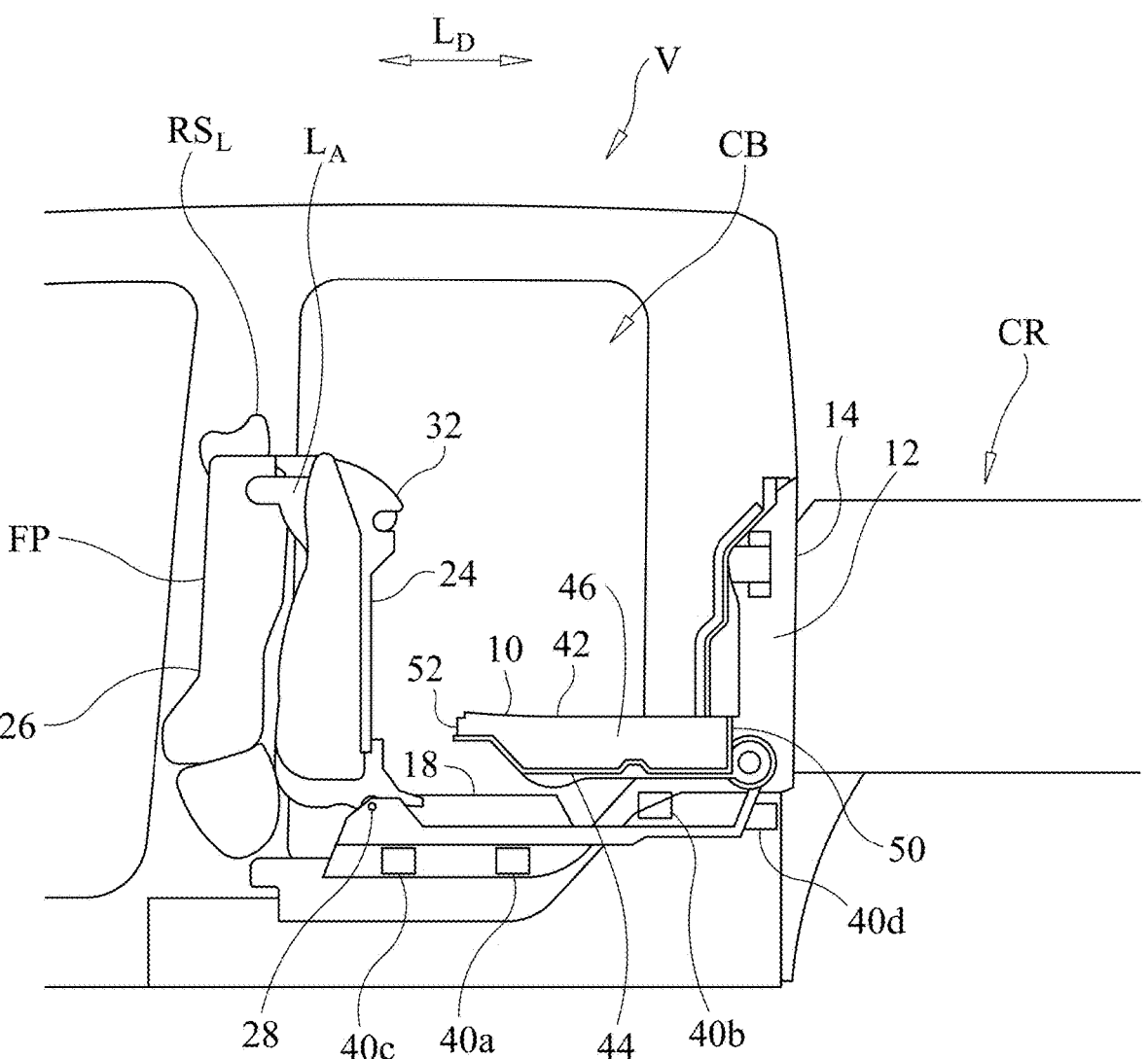
FIG. 12 is a side view in section of the gate in an open configuration with the right and left rear seats in a folded configuration.

As shown in FIGS. 9 and 12, the right and left rear seats $RS_R$ and $RS_L$ in the cabin area CB are configured to be pivotable in a forward direction of the vehicle V. In this embodiment, the right and left rear seats $RS_R$ and $RS_L$ have a back portion 24 and a seating portion 26. Upon activation a folding activation member (e.g., a button, a lever or other device to cause the seats to fold), the back portion 24 will pivot or fold about a lateral axis $L_a$ between the back portion 24 and the seating portion 26. The seating portion 26 (at a front end thereof) will then pivot on a pivot member 28 along a lateral axis La at the floor 18 of the cabin area CB to fold to a forward position FP. This positioning of the right and left rear seats $RS_R$ and $RS_L$ enables the gate 10 to contact the floor 18 of the cabin area CB, as discussed in more detail below.

Figure 10:
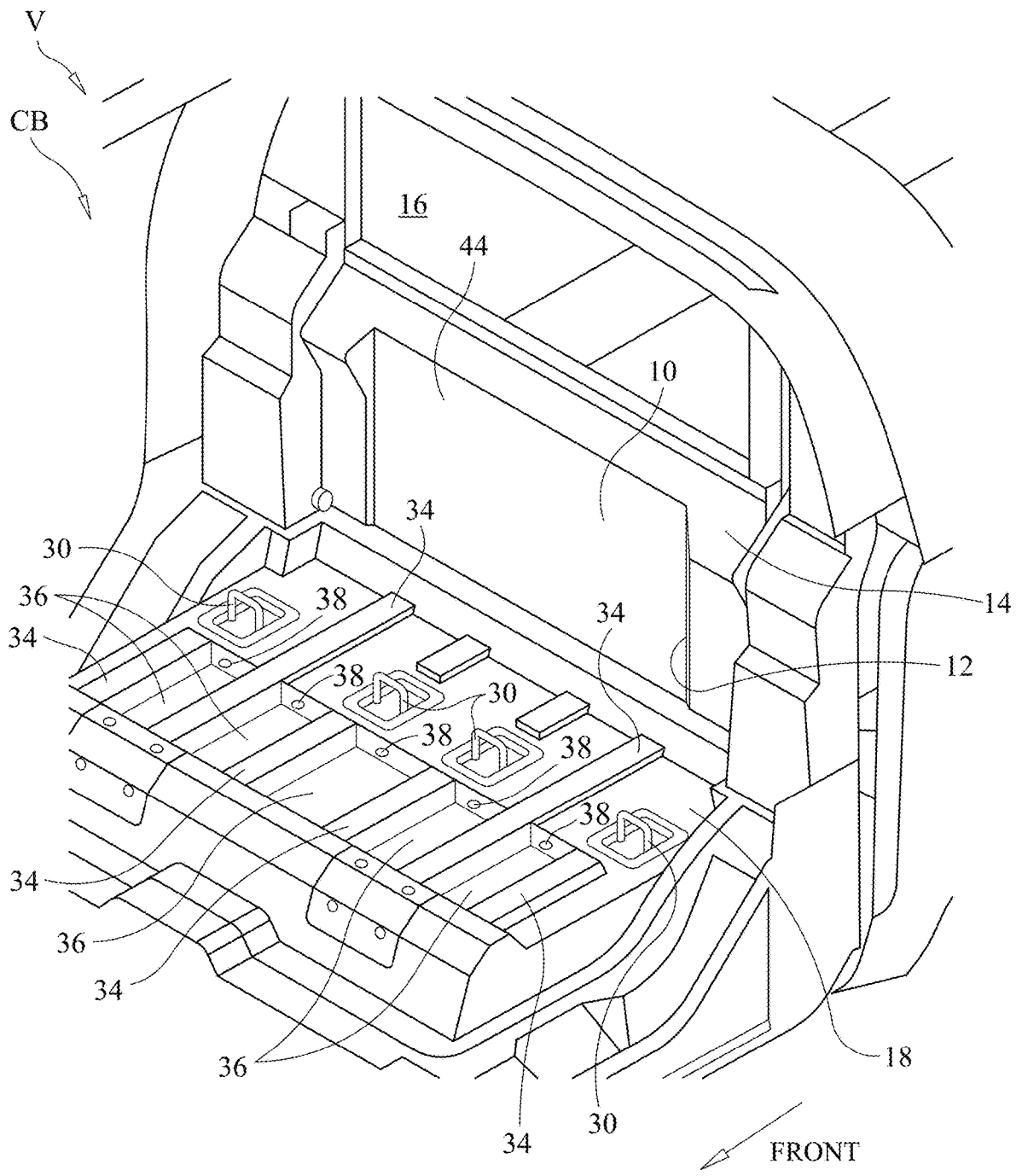
FIG. 10 is an enlarged perspective view in section illustrating the gate in a closed configuration.

As shown in FIGS. 9, 10 and 12, the floor 18 in the cabin area CB is generally planar and includes two brackets 30 (latches) for each rear seat. That is, the right and left rear seats $RS_R$ and $RS_L$ include bracket 30 (latch) receivers that couple to the brackets 30 on the floor 18 so that the right and left rear seats $RS_R$ and $RS_L$ can be fixed in a sitting configuration. The brackets 30 are conventional U-shaped metal brackets that are configured to couple to latch receivers 32 in the seating portion 26 of the right and left rear seats $RS_R$ and $RS_L$ As described above, to move the right and left rear seats $RS_R$ and $RS_L$ from the sitting configuration to the deployed configuration, the folding activation member is operated and the bracket receivers 32 are released from the brackets 30 and the right and left rear seats $RS_R$ and $RS_L$ can be deployed into the folded configuration described above. In one embodiment, the right and left rear seats $RS_R$ and $RS_L$ can be deployed automatically by a coil spring.

The floor 18 includes ribs 34 that are raised protrusions. The ribs 34 support the gate 10, when the gate 10 is in the open configuration. The ribs 34 have a height that is greater than the height of the brackets 30 and therefore enable the gate 10 to occupy the open configuration without contact the brackets 30. As can be understood, in one embodiment, the seat brackets 30 are spaced from the gate 10 while the gate 10 is disposed in the open position. Thus, the ribs 34 not only protect the cabin facing surface of the gate 10 from damage, but also simultaneously protect the brackets 30 from being damaged.

Between the ribs 34, storage areas 36 can be disposed. The storage areas 36 can include a lid or cover to enable a user to place objects or other element sin the storage areas

36 and protect the objects in the storage area from the outside elements. The lid can be hinged to one side of the storage areas 36 or to the rib 34 and can have a latching mechanism 38 (and/or a locking mechanism) to securely close the storage area. As seen in FIG. 9, the storage areas 36 are generally rectangular and occupy the entire lateral space between the ribs 34. As can be understood, the floor 18 can include one or a plurality of storage areas 36.

As shown in FIG. 12, the floor 18 can also include a plurality of cross members 40*a-d*. In this embodiment, the floor 18 includes four cross members 40*a-d*. The cross members 40*a-d* can be metal beams that extend in a lateral direction of the vehicle V. That is, the cross members 40*a-d* extend in a direction that is transverse to the longitudinal direction $L_D$ of the vehicle V. The cross members 40*a-d* can be attached structural components on the door frame of the vehicle V and are capable of providing support the floor 18. For example, the first cross member 40*a* can support the gate 10 in the open position. That is as illustrated in FIG. 12, the top portion of the gate 10 can overlie the first cross member, and is thus supported by the first cross member 40*a*. The second cross member 40*b* can support the seat brackets 30. The third cross 40*c* can support the pivot member 28 on the seats. The fourth cross member 40*d* can support the actuation members, as discussed in more detail below.

The cross members 40*a-d* can be disposed directly underneath the floor 18 and support the floor 18. The cross members 40*a-d* can be located and support the floor 18 in any suitable manner. Moreover, the cross members can be tubular metal members or be made from any suitable material and have any suitable configuration.

Figure 11:
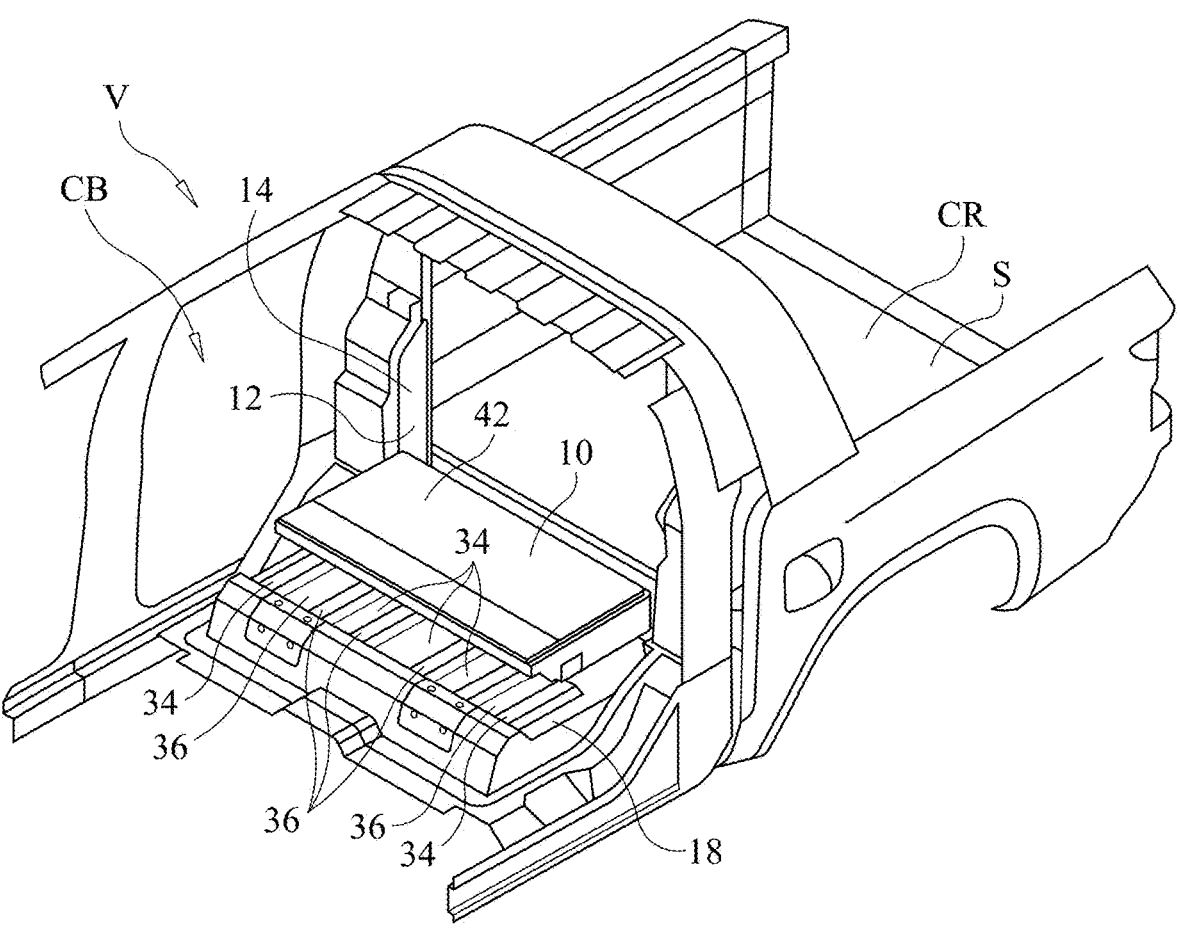
FIG. 11 is a perspective view of the gate in an open configuration.
Figure 13:
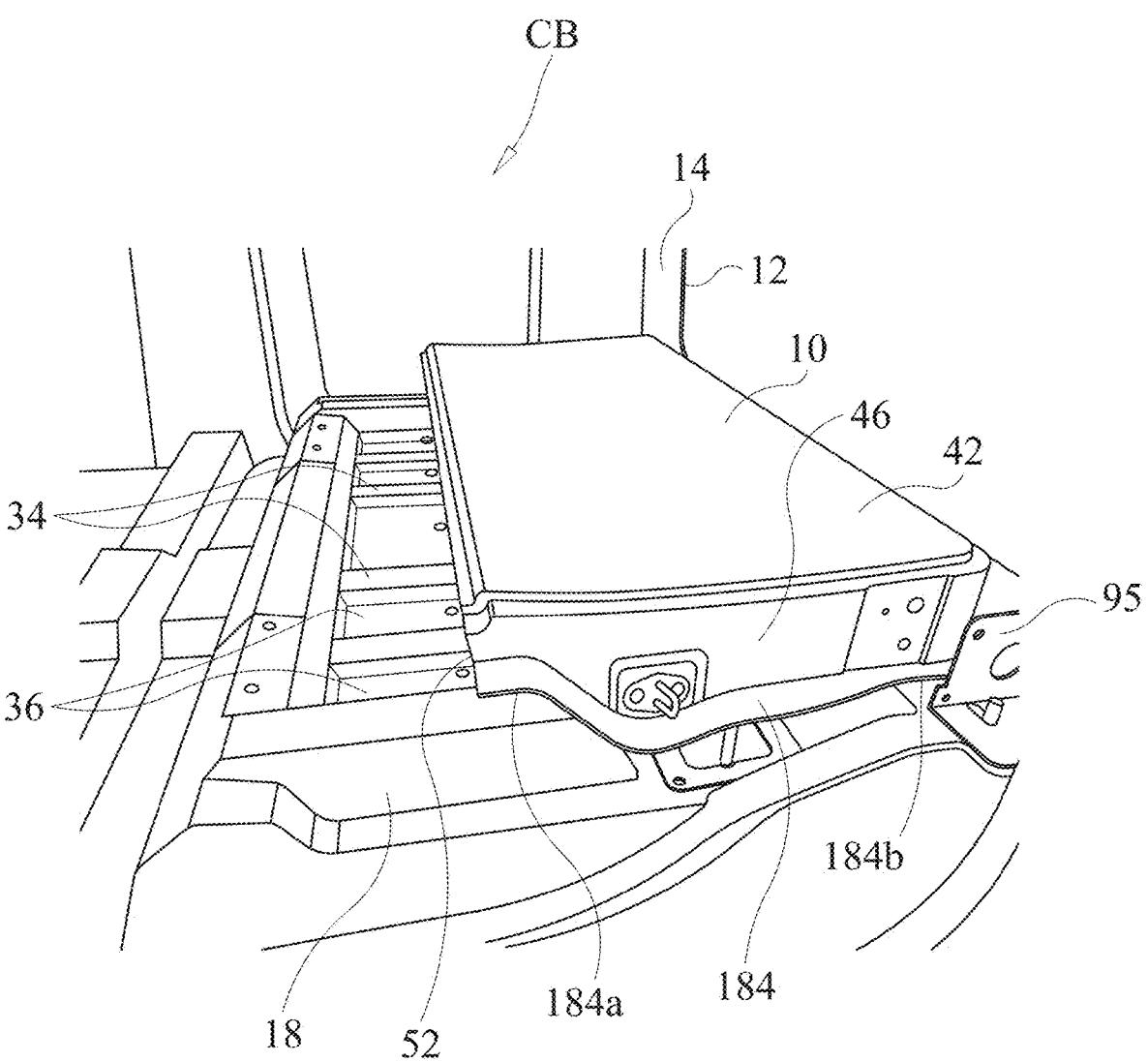
FIG. 13 is a side view in section of the gate in an open configuration.
Figure 14:
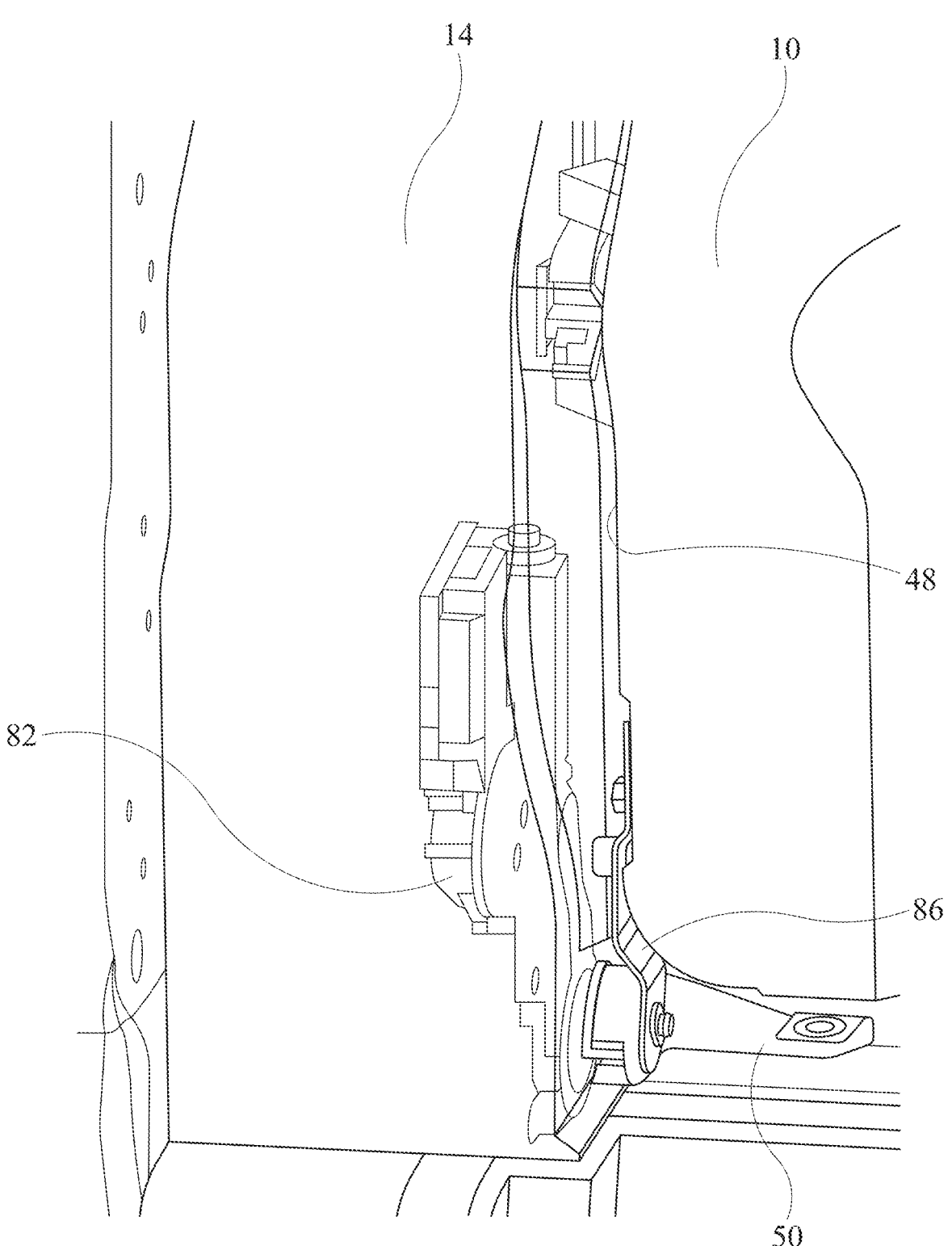
FIG. 14 is an enlarged right side view of the gate and actuator in the closed configuration.

As seen in FIGS. 10-13, the gate 10 can move between a closed position (FIG. 10) and an open position (FIG. 11). In the closed position the gate 10 is disposed within the opening 12 in the wall 14. The gate 10 includes a first surface 42 and a second surface 44, in the closed configuration, the first surface 42 faces in a direction of the cargo area CR and the second surface 44 faces in the direction of the cabin area CB. In the open configuration the first surface 42 of the gate 10 is generally planar with the cargo bed surface S and the second surface 44 is supported by the floor 18 and/or the first cross support. The gate 10 further includes a left side surface 46, a right side surface 48, a bottom surface 50 and a top surface 52. As shown in FIGS. 13 and 34, the left and right side surfaces 46 and 48 each include a lateral flange 184. As can be understood, the lateral flanges 184 extends from the gate to cover a gap in the cabin area CB between the gate and the interior of the vehicle V. The flange 184 can be disposed at the second surface 44, which is on the cabin side of the gate 10. The flange has an upper end 184*a* and a lower end 184*b*, the upper end 184*a* being wider than the lower end 184*b*.

Figure 8:
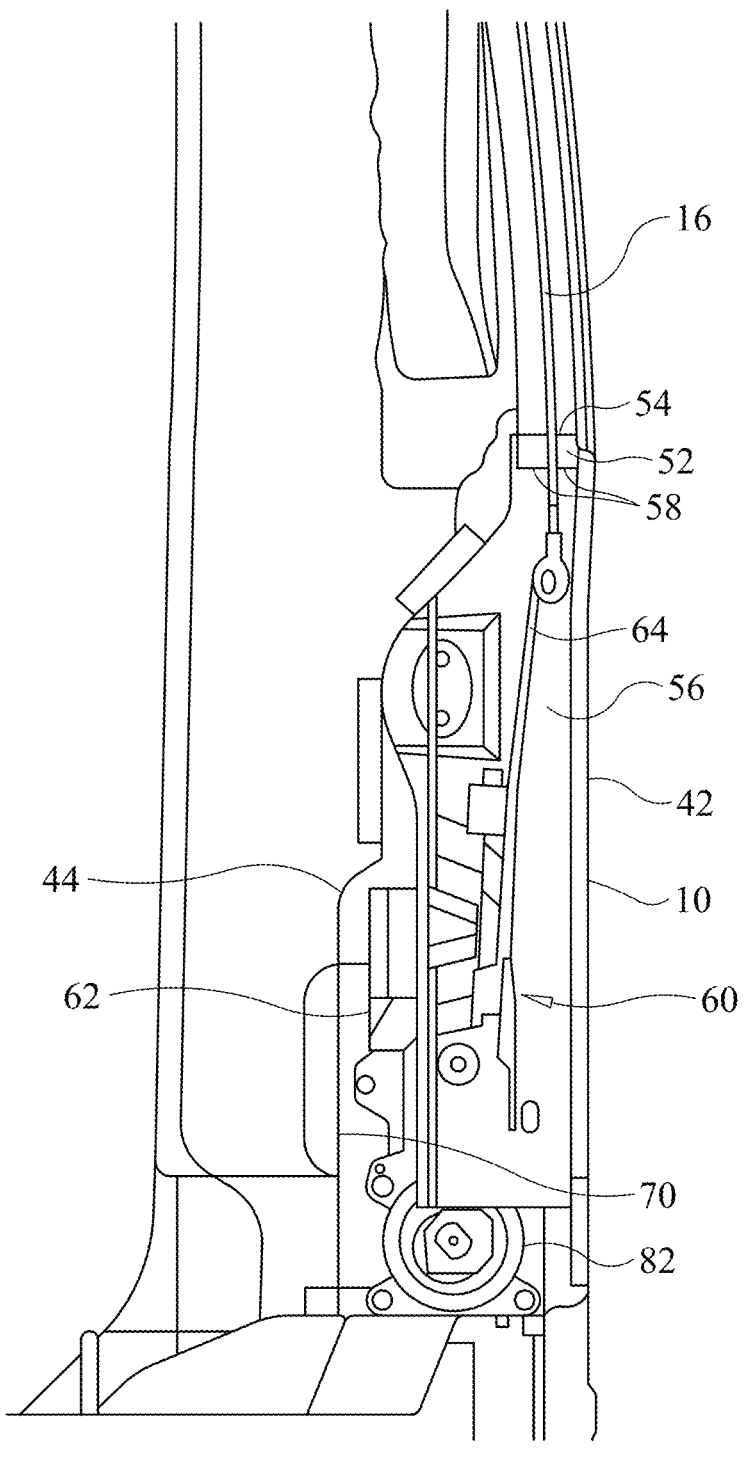
FIG. 8 is a side view in section of gate with the window movement system in a closed or up configuration.

As shown in FIG. 8, the top surface 52 includes an opening 54 that enables the window 16 to lower within a hollow interior 56 of the gate 10. As can be understood, the top surface 52, on either side of the opening 54 can include a rubber seal 58 that contacts the window 16 to seal the interior of the gate 10 from the outside. Such a seal is generally known, and therefore a detail description is not necessary.

Figure 6:
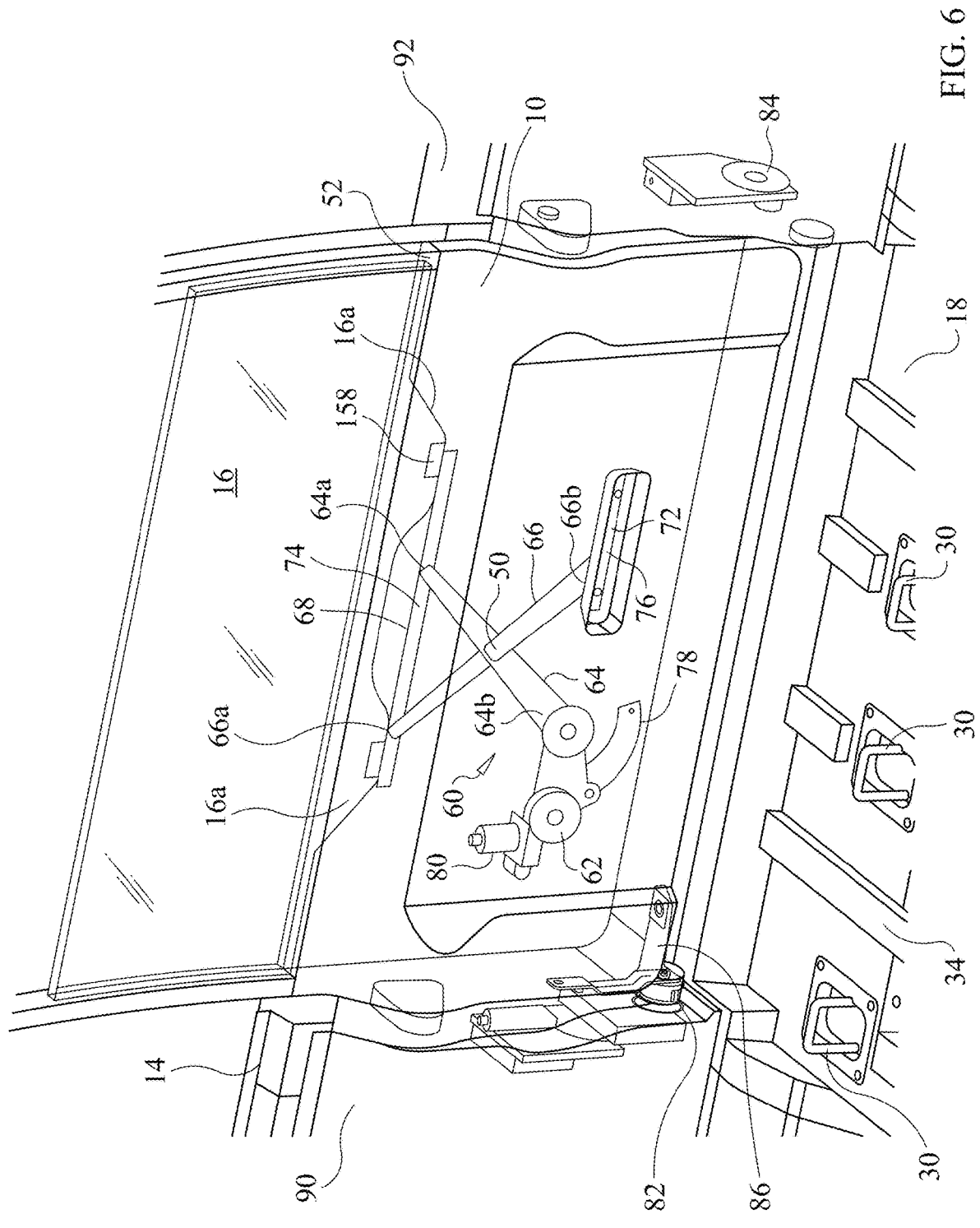
FIG. 6 is a view of the gate with window movement system in a closed or up configuration.
Figure 7:
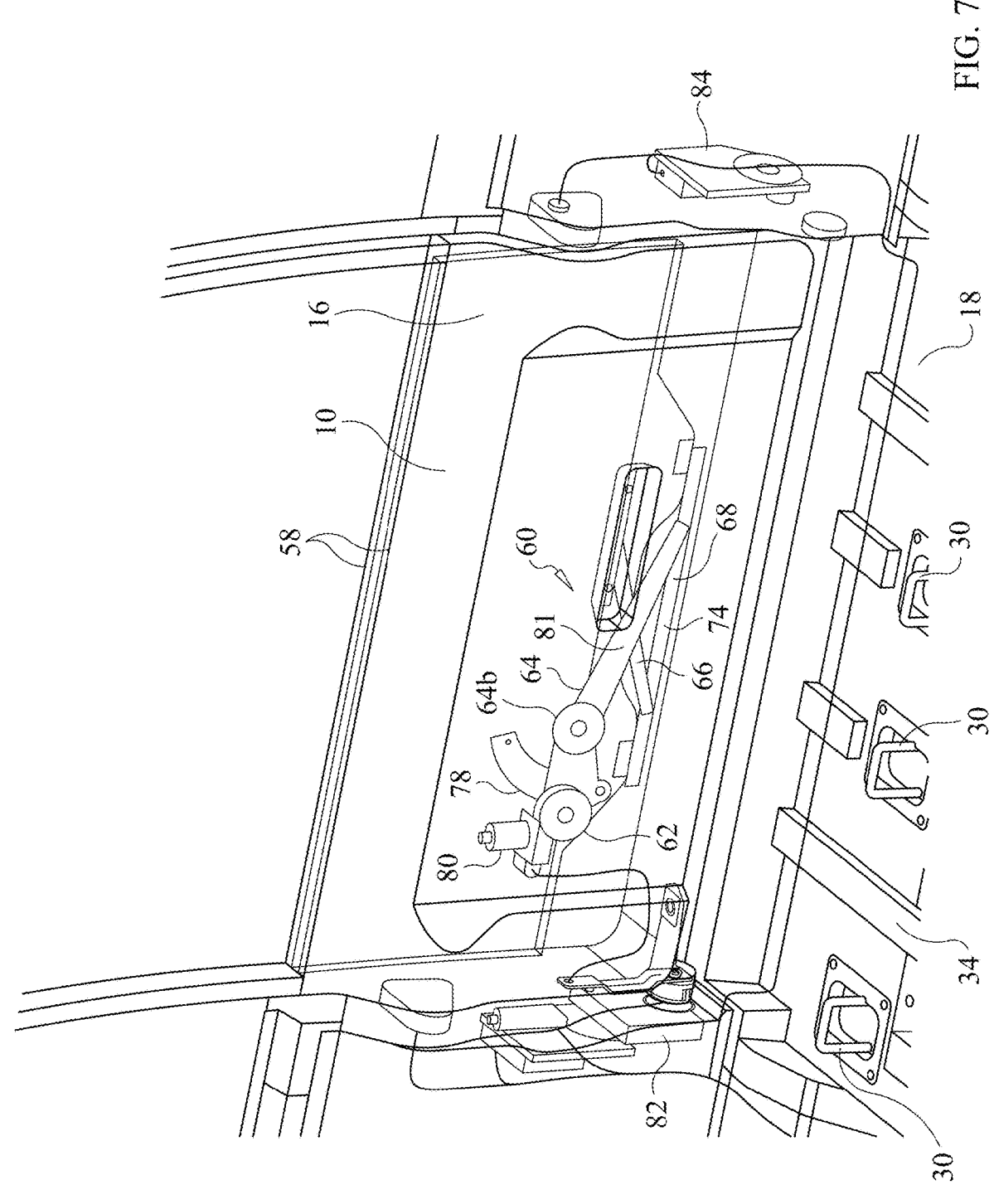
FIG. 7 is a view of the gate with the widow movement system in an open or down configuration.

The hollow interior 56 of the gate 10 houses an actuation system 60 for the window 16. As illustrated in FIG. 6-8, the actuation system includes an actuator 62, first and second deployment arms 64 and 66 and an attachment member 68. As seen in FIG. 8, the actuator is disposed inside the gate 10 attached to the inside surface 70 of the hollow interior 56 of the gate 10.

The attachment member 68 is preferably a longitudinal bracket that is coupled to the first ends 64*a* and 66*a* of the first and second deployment arms 64 and 66 and to the bottom portion 16*a* of the window 16. The second end 64*b* of the first deployment 64 arm is coupled to an a rotational portion the actuator 62 and the second end 66*b* of the second deployment 66 arm is coupled to a fixed bracket 72.

The attachment member 68 includes a longitudinal slot 74 to which the first ends 64*a* and 66*a* of the first and second deployment arms 64 and 66 are inserted. Thus, as can be understood, the first ends 64*a* and 66*a* of the first and second deployment arms 64 and 66 are capable of sliding within the longitudinal slot 74, while remaining fixed to the attachment member 68. The fixed bracket 72 has a longitudinal slot 76 and the second end 66*b* of the second deployment arm 66 is disposed within the longitudinal slot 76. Thus, the second end 66*b* of the second deployment arm 66 is capable of sliding within the longitudinal slot 76 of the fixed bracket 72, while remaining attached to the fixed bracket 72.

The actuator 62 is capable of rotating an arcuate member 78 using a set of gears with an electric motor 80 that operates upon activation of the first button 20. When the arcuate member 78 rotates the second end 64*b* of the first deployment arm 64 is rotated in a clockwise direction. This causes the first end 64*a* of the first deployment arm 64 to travel in a downward direction. Since the first deployment arm 64 is coupled to the second deployment 66 at the central portion 81 thereof, the second deployment arm 66 moves in a downward direction. The first ends 64*a* and 66*a* of both the first and second deployment arms 64 and 66 slide within the longitudinal slot 74 of the attachment member 68 and the second end 66*b* of the second deployment arm 66 slides within the longitudinal slot 76 of the fixed bracket 72. This motion causes the attachment member 68 to move the window 16 in a downward direction. Accordingly, when the actuator 62 is activated the actuator 62 operates the deployment arms 64 and 66 and lowers (or raises) the window 16.

As illustrated in FIGS. 6, 7, 14 and 15, the gate 10 can be moved from the closed configuration to the open configuration with first and second actuators 82 and 84. The first actuator 82 can be disposed within the wall 14 adjacent the bottom surface 50 of the gate 10 on the right side of the vehicle V and the second actuator 84 can be disposed within the wall 14 adjacent the bottom surface 50 of the gate 10 on the left side of the vehicle V. Accordingly, the first and second actuators 82 and 84 are located outboard of the gate 10. Each of the first and second actuators 82 and 84 can be supported by the fourth cross member 40*d*, as shown in FIG. 12. The first actuator 82 is attached to the corner of the gate 10 by the first hinge 86 and the second actuator 84 is attached to the corner of the gate 10 by the second hinge 88. As can be understood, the first hinge 86 is attached to the first actuator 82 at a first rotational orientation (counterclockwise), and the second hinge 88 is attached to the second actuator 84 at a second rotational orientation (clockwise), the first rotational orientation being different from the second rotational orientation.

The first and second actuators 82 and 84 are electrical actuators that can produce torque which causes rotation of the first hinge 86 and 88. As can be understood, the first and second actuators 82 and 84 are electrically connected to the electrical system ES of the vehicle V and can draw power in a conventional manner. That is, as known in the art, the electrical system can include a battery and an alternator and any other suitable devices known in the art. The first and second actuators 82 and 84 are further electrically connected to the second button 22. Thus, when the second button 22 is activated to move the gate 10 from the closed configuration to the open configuration, the first and second actuators 82 and 84 rotate the first hinge 86 and 88 in a forward direction to pivot the gate 10 into the open configuration. Conversely, when the second button 22 is activated to move the gate 10 from the open configuration to the closed configuration, the first and second actuators 82 and 84 rotate the first hinge 86 and 88 in a rearward direction to pivot the gate 10 into the closed configuration.

The reverse procedure occurs when the second button 22 is operated to move the window 16 from the open position to the closed position.

As seen in FIGS. 6-8, the first and second actuators 82 and 84 that move the gate 10 are disposed within a trim panels 90 and 92 on the right and left sides of the gate 10 respectively. As can be understood, the first and second actuators 82 and 84 are electrically connected to the second button 22 and can be operated to move the gate 10 from the closed configuration to the open configuration.

Figure 16:
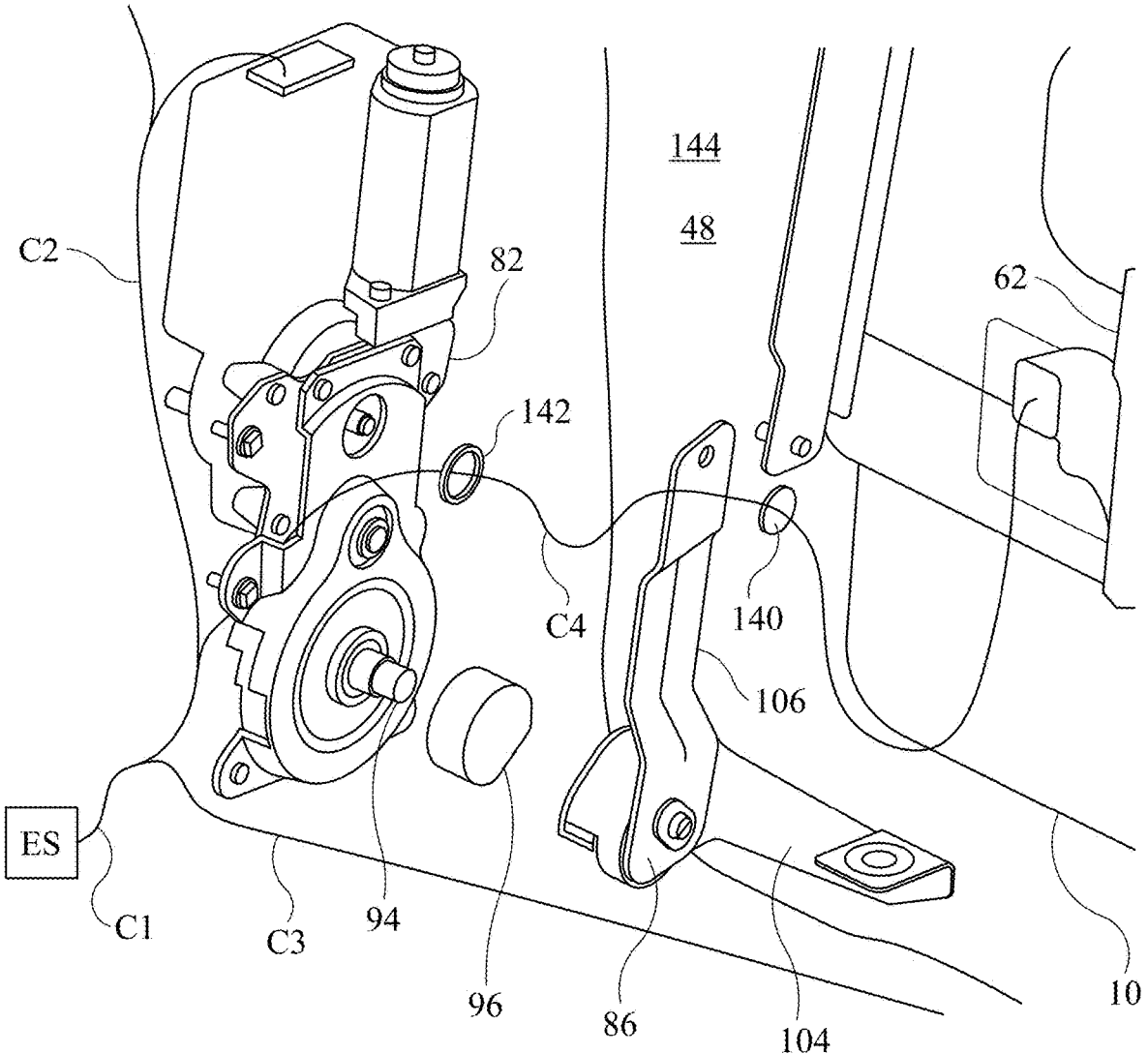
FIG. 16 is a view of the right side of the gate and the right actuator.
Figure 17:
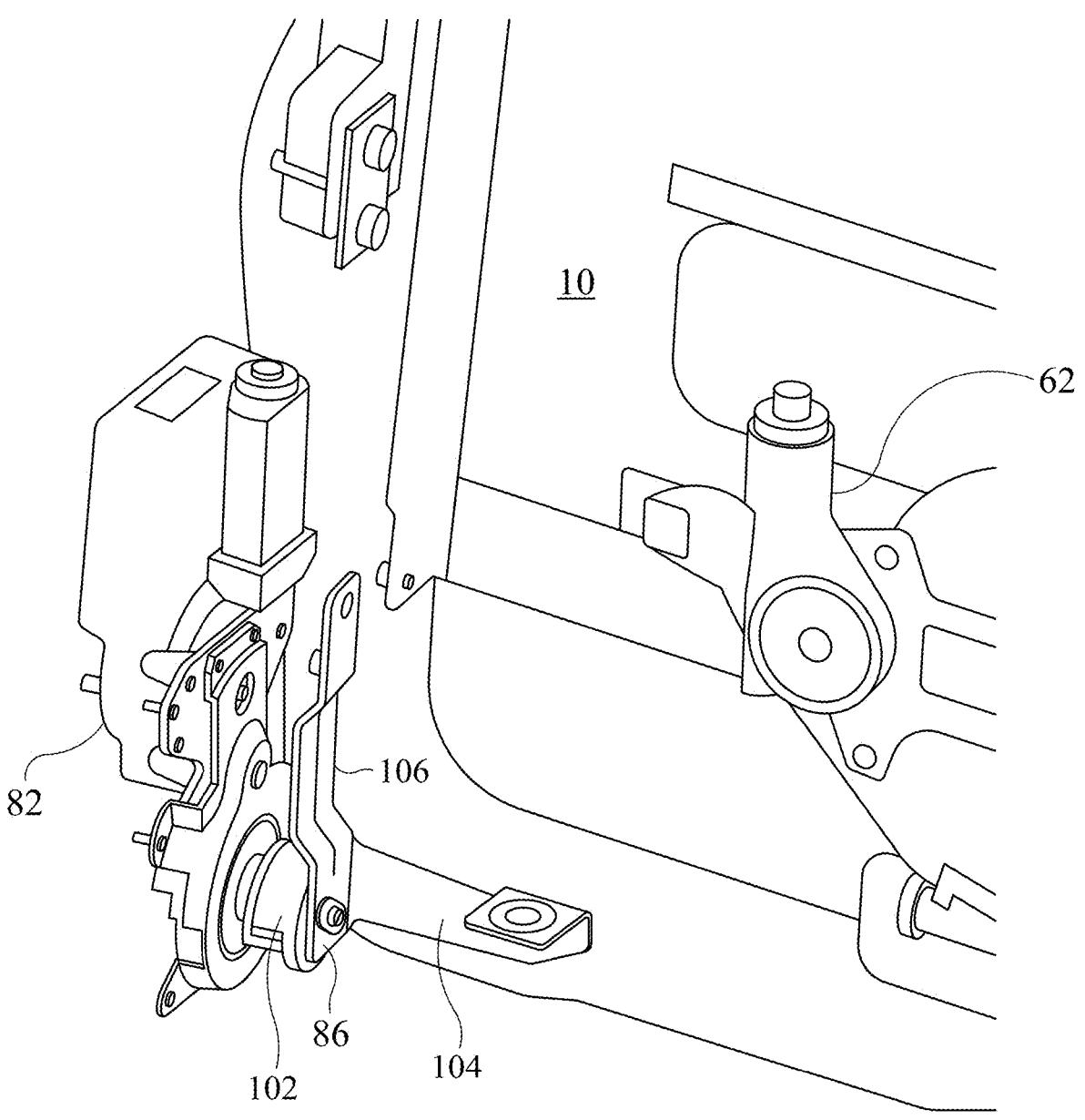
FIG. 17 is an exploded view of the right side of the gate and the right actuator.
Figures 18, 19, 20:
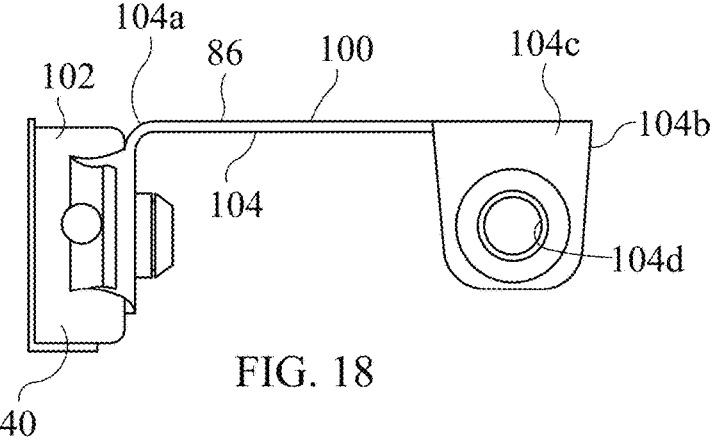
FIG. 18 is a top view of right hinge.
FIG. 19 is a front view of the right hinge.
FIG. 20 is side view of the right hinge.
Figure 21:
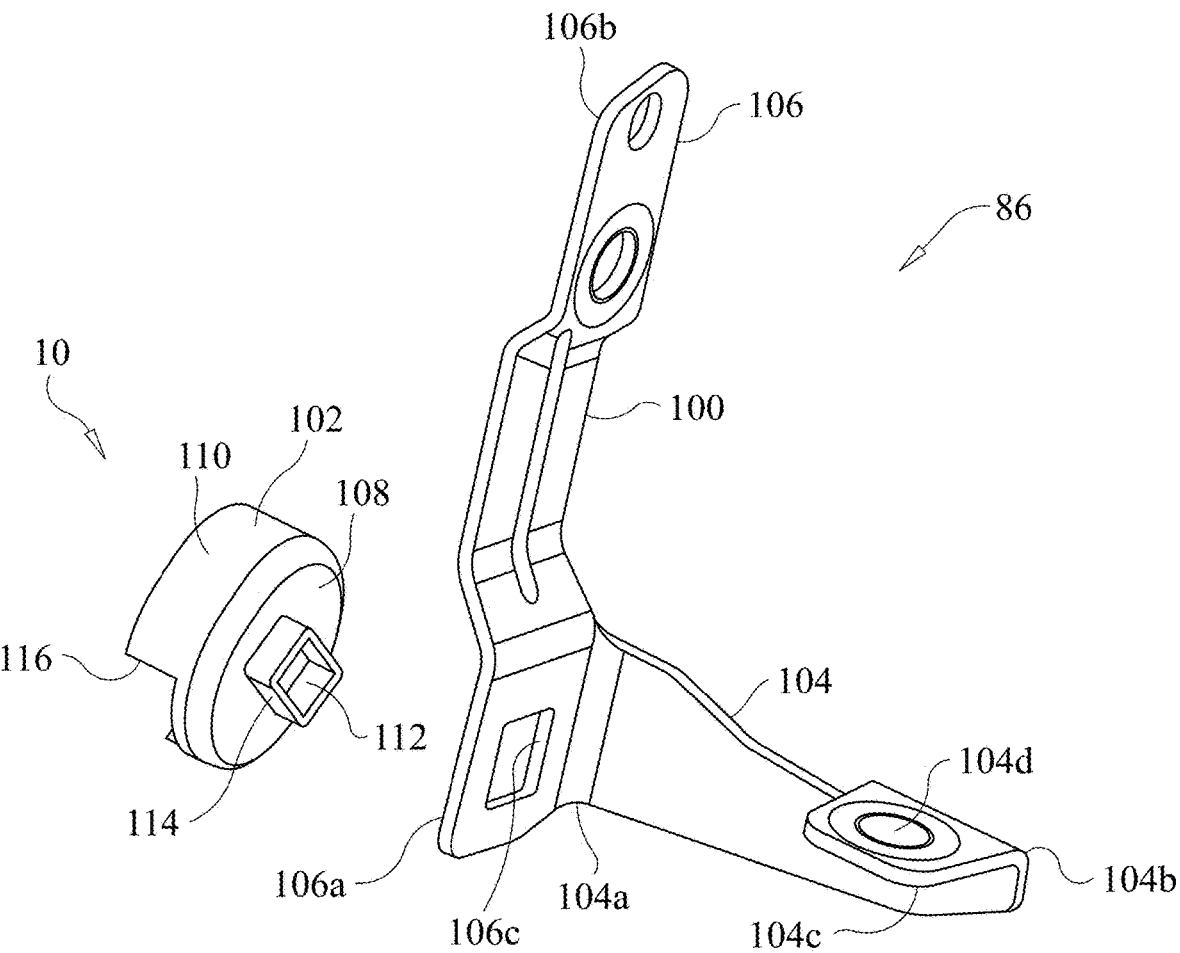
FIG. 21 is an exploded view of the right hinge.
Figures 22, 23, 24:
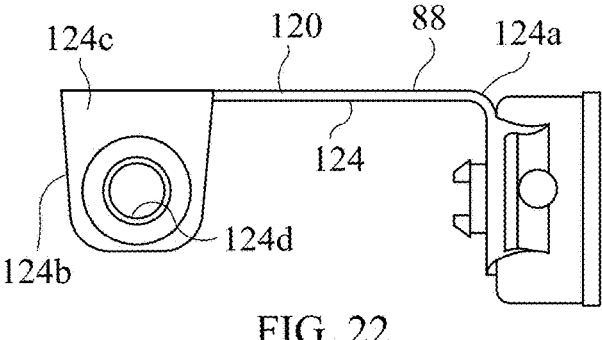
FIG. 22 is a top view of left hinge.
FIG. 23 is a front view of the left hinge.
FIG. 24 is side view of the left hinge.
Figure 25:
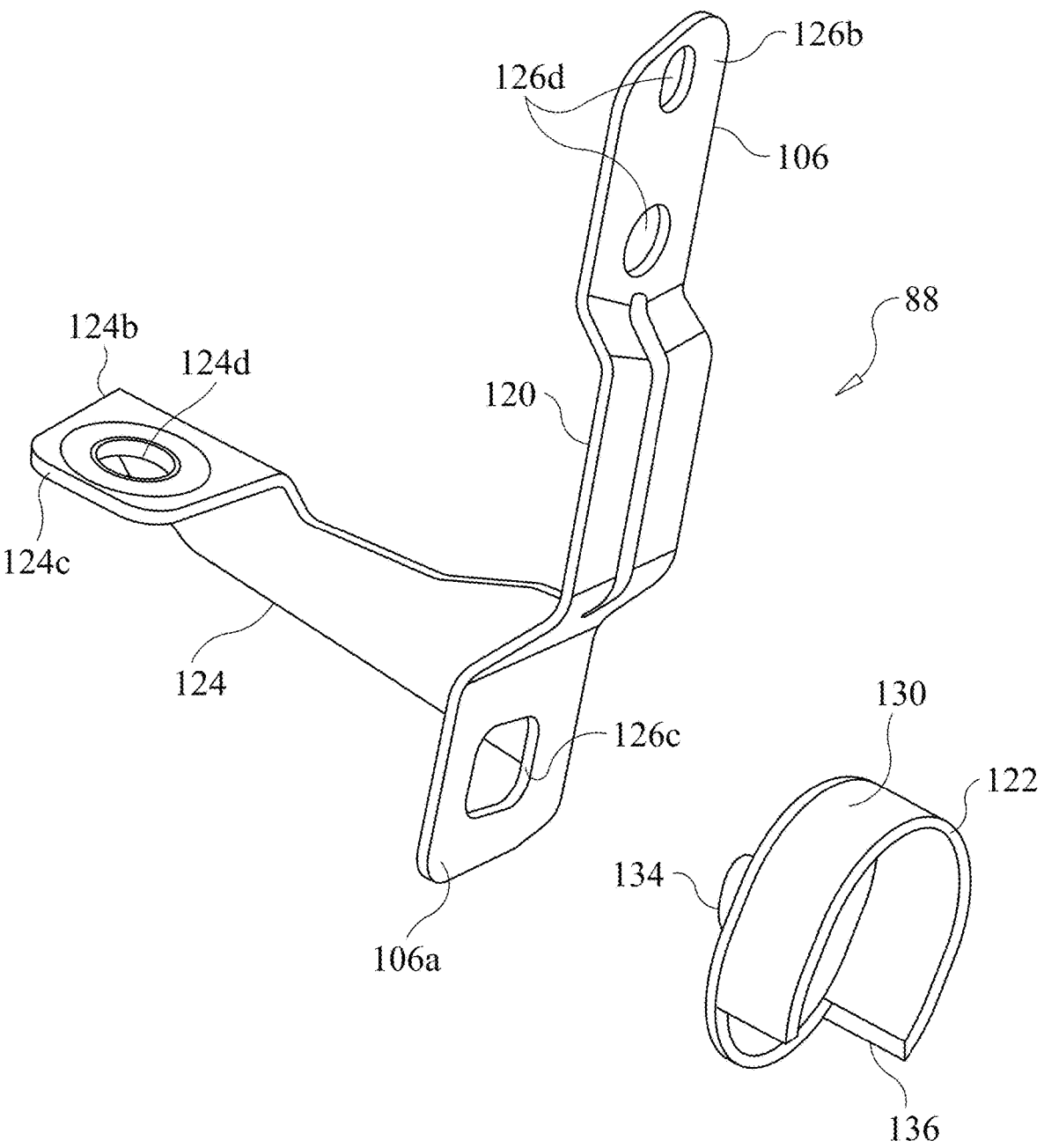
FIG. 25 is an exploded view of the left hinge.

In one embodiment, as shown in FIG. 16, the power for the actuator 62 disposed inside the gate 10 receives power through the first actuator 82. In other words, the actuator 62 inside the gate 10 is electrically in series with the first actuator 82. The second actuator 84 is disposed electrically in parallel with the first actuator 82. Here, a first conductor (or wire) C1 is connected to the electrical system ES of the vehicle V. The first conductor C1 can split into a second a conductor C2 and a third conductor C3. The second conductor C2 is electrically connected to the first actuator 82 and the third conductor C3 is electrically connected to the second actuator 84. The fourth wire is electrically conducted between the first actuator 82 and the actuator 62 in the gate 10. This electrical configuration reduces the required wiring and simplifies the electrical configuration. Moreover, this configuration can enable single button operation. That is, when the first button 20 is operated, the actuator disposed inside the gate 10 moves the window 16 from the closed position to the open position. Upon reaching the open position, the operator can pause operation and the window 16 will remain in the open position while the gate 10 will occupy a closed configuration. However, if the first button 20 is operated again or is continued to be operated, electricity is supplied to the first and second actuators 82 and 84, which cause the gate 10 to move from the closed configuration to the open configuration.

The first button 20 can then be operated again to supply electricity to the first and second actuators 82 and 84, which cause the gate 10 to move from the open configuration to the closed configuration. Upon reaching the closed configuration, the operator can pause operation and the window 16 will remain in the open position while the gate 10 will occupy a closed configuration. However, if the first button 20 is operated again or is continued to be operated, electricity is supplied to the actuator 62 disposed inside the gate 10, which causes the window 16 to move from the open position to the closed position. Thus, in this embodiment, full operation of the gate 10 is capable with just one button. However, it understood that the gate 10 and/or window 16 can be operated with one, two or more buttons.

The first and second actuators 82 and 84 are connected to the gate 10 by the first hinge 86 and 88, respectively. FIGS. 14-17 illustrate the connection of the first actuator 82 to the right side surface 48 of the gate 10. The second actuator 84 is couple do the left side surface 46 of the gate 10 in a substantially similar manner. The first actuator 82 is fixed to the floor 18 of the vehicle V compartment using a bracket 93, and in one embodiment can be connected to and supported by the cross member 40d. The second actuator 84 is fixed to the floor 18 of the vehicle V compartment using a bracket 95, and in one embodiment can be connected to and supported by the cross member 40d. As shown in FIG. 13, the upper end 184a of the flange 184 is outboard of the bracket 95 relative to the gate 10 and the lower end 184b of the flange 184 is inboard of the bracket 95 relative to the gate 10, since the upper end 184a of the flange 184 is wider than the lower end 184b of the flange 184. As can be understood, the right side of the gate includes a flange having the same configuration. This configuration enables maximum coverage of the gap in the cabin area CB between the gate and the interior of the vehicle V without interfering with the operation of the actuators 82 and 84 during operation of the gate 10.

The first actuator 82 is configured to rotate an axel 94 which in turn rotates a the first hinge 86, causing the gate 10 to open and close. A protrusion 96 surrounds the rotating axel 94, the protrusion 96 does not rotate. The protrusion 96 can have a longitudinal shape, such that the is protrusion 96 has a pill like configuration.

As illustrated in FIGS. 18-25, the first and second hinges 86 and 88 have an L-shaped configuration. In one embodiment, the first and second first hinge 86 and 88 are made from metal, but the first and second first hinge 86 and 88 can be made from any material desired.

The first hinge is illustrated in FIGS. 18-21. The first hinge 86 includes a first bracket 100 and a first cup-shaped portion 102. The first bracket 86 includes a first connecting portion 104, a second connection portion 106 transverse (e.g., generally perpendicular) to the first connecting portion 104. The first connecting portion 104 extends in the horizontal direction when the gate 10 is in the closed configuration and the second connecting portion 106 extends in the vertical direction when the gate 10 is in the closed configuration. The first connecting portion 104 is attached to and extends from the second connecting portion 106. The second connecting portion 106 has a proximal 106a and a distal end 106b. The proximal end 106a of the second connecting portion 106 includes a generally rectangular opening 106c to enable connection to the first actuator 82. The distal end 106b of the second connecting portion 106 includes two opening 12s that enable connection to the right side of the gate 10. The first connecting portion 104 has a proximal 104a and a distal end 104b. The first connecting portion 104 is connected at the proximal end 104 to the proximal end 106a of the second connecting portion 106. The distal end 104b of the first connecting portion 104 includes a flange 104c with an opening 104d to connect to the bottom surface 50 of the gate 10.

The first cup-shaped portion 102 is made from a plastic or rigid material and includes a base portion a108 and a cup portion 110 extending from the base portion 108. The base portion includes 109 an opening 112 and a cylindrical protrusion 114 surrounding the opening 112. The protrusion 114 is generally rectangular and is configured to fit within the opening 106c in the proximal end 106a of the second bracket 106. Since both the opening 106c in the proximal end 106a of the second connecting portion 106 and the protrusion 114 on the base 108 of the first cup-shaped portion 102 are generally rectangular, the first bracket 100 can be prevented from slipping or rotating relative to the first cup-shaped portion 102, This configuration ensures a proper and consistent rotation of the gate 10. The cup portion 110 extends generally perpendicular from the base portion 108 and includes a circumferential gap 116. The circumferential gap 116 is at about 10-30 degrees and enables removable of the gate 10, as discussed in more detail below.

The second hinge 88 is illustrated in FIGS. 22-25 The second hinge 88 includes a second bracket 120 and a second cup-shaped portion 122. The second hinge 88 includes a first connecting portion 124, a second connection portion 126 transverse (e.g., generally perpendicular) to the first connecting portion 124. The first connecting portion 124 extends in the horizontal direction when the gate 10 is in the closed configuration and the second connecting portion 126 extends in the vertical direction when the gate 10 is in the closed configuration. The first connecting portion 124 is attached to and extends from the second connecting portion 126. The second connecting portion 126 has a proximal end 126a and a distal end 126b. The proximal end 126a includes a generally rectangular opening 126c to enable connection to the second actuator 84. The distal end 126b includes two opening 126d that enable connection to the left side of the gate 10. The first connecting portion 124 has a proximal end 124a and a distal end a124b. The first connecting portion 124 is connected at the proximal end 124a to the proximal end 126a of the second connecting portion 126. The distal end 124b of the first connecting portion 124 includes a flange 124c with an opening 124d to connect to the bottom surface 50 of the gate 10.

The second cup-shaped portion 122 is made from a plastic or rigid material and includes a base portion 128 and a cup portion 130 extending from the base portion 128. The base portion 128 includes an opening 132 and a protrusion 134 surrounding the opening 132. The protrusion 134 is generally rectangular and is configured to fit within the opening 126c in the proximal end 126a of the second bracket 126. Since both the opening 126c in the proximal end 126b of the second connecting portion 126 and the protrusion 134 on the base 128 of the second cup-shaped portion 122 are generally rectangular, the second bracket 120 can be prevented from slipping or rotating relative to the second cup-shaped portion 122, This configuration ensures a proper and consistent rotation of the gate 10. The cup portion 130 extends generally perpendicular from the base portion 128 and includes a circumferential gap 136. The circumferential gap 136 is at about 35-70 degrees and enables removable of the gate 10, as discussed in more detail below.

As shown in FIGS. 16, the first and second actuators 82 and 84 for moving the gate 10 from the closed configuration to the open configuration are supplied with power from the same power supply as the actuator 62 for moving the window 16 from the closed configuration to the open configuration. In other words, in one embodiment, a single power source supplies power to the actuators for moving the gate 10 and to the actuator for moving the window 16. In one embodiment, the fourth conductor C4 for supplying power to the actuator 62, extends from the first actuator 82 through an opening 140 in the right side surface 48 of the gate 10. The opening 140 can include a grommet 142 to seal the opening 140.

The gate 10 has a panel 144 that corresponds to a panel in the wall 14. The electrical wiring C$ from the actuator 82 can pass through the panel in the wall 14, into the panel 144 in the gate 10 and to the actuator 62 for the window 16. This enables most electrical and power components for the gate 10 to be disposed in the wall 14 and outside of the gate 10. In this case, the gate 10 is relatively light and easier to position by the actuators and/or be removed by a user.

Figure 15:
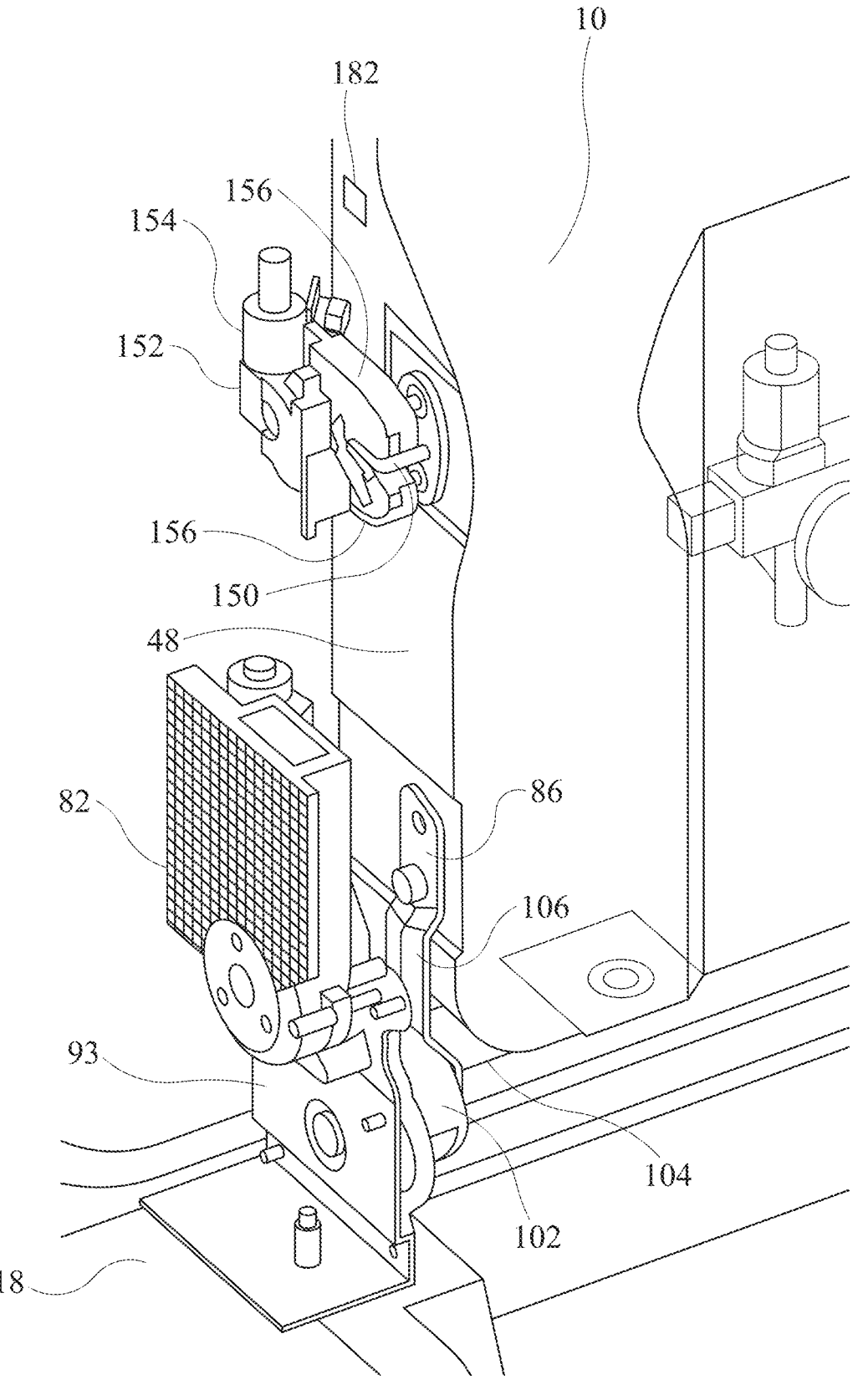
FIG. 15 is a partial side view of the gate in a closed and latched configuration.

As shown in FIG. 15, the gate 10 includes a first striker or latch 150 on the right side surface 48 that connects to a latch receiver 152. As can be seen, the latch receiver 152 is aligned vertically above the coupling between the first actuator 82 and the first bracket 86. In one embodiment a second striker or latch is disposed on the of the left side surface 46 of the gate 10 and is received by a second latch receiver (not shown). However, since operation of the latch 150 and the latch receiver 152 on the left and right sides are identical, only the right side will be described herein. It can be understood that the gate 10 can include one or both of the first latch 150 and the second latch. Any description of the latch 150 on the right side wall 48 will apply to a latch on the left side wall 56. The latch 150 is positioned to engage a latch receiver 152 in the trim panel or wall 14 of the vehicle V compartment. The latch 150 is a metal tube that includes a first portion 150a that extends outwardly from the right side wall 48 of the gate 10 and a second portion 150b that is transverse to the first portion 150a and extends generally parallel to the right side wall 48 and a third portion 150c extends outwardly from the right side wall 48 of the gate 10 and connects to the second portion 150b. in one embodiment, the latch 150 can include a base member 150d that connects the latch 150 to the right side wall 48.

The latch receiver 152 is disposed in the wall 14 and includes an actuator 154 and receiver members 156 to cause the gate 10 to be locked or fixed within the opening 12 in the wall 14. The latch receiver 152 is a power actuator that is configured to lock and couple to the latch 150. In one embodiment, the second portion 150b of the latch 150 is received within the receiver members 156 of the latch receiver 152. The latch receiver 152 can be activated by the first and/or second button 20 and 22 to lock and/or unlock the latch receiver 152. The latch receiver 152 is generally known and a detailed description is not necessary.

To operate the gate 10, first the rears seats $RS_R$ and $RS_L$ are activated to pivot the seats in the forward direction, as for example FIGS. 9 and 12. That is, the back portion 24 of the seat pivots about the longitudinal axis touch that the back portion 24 lies on the seating portion 26. The seating portion 26 is released from the latches 30 on the floor 18 and, along with the back portion 24, can then pivot about the pivot portion 28 in the forward direction. This action moves the rears seats $RS_R$ and $RS_L$ out of the way from the gate 10 and exposes the floor 18 of the cabin portion CB.

The first button 20 is then operated to move the window 16 from a closed configuration to an open configuration. In one embodiment, the gate 10 can include a sensor or switch mechanism 158 (FIG. 6) to determine that the window 16 is in the fully open configuration. In other words, the gate 10 can have a switch or sensor 158 that determines or detects that the window 16 is fully disposed in the interior of the gate 10. If the window 16 is not fully disposed within the interior of the gate 10, the gate 10 is prevented from moving from the closed configuration to the open configuration.

In another embodiment, movement of the gate 10 is performed using the same button (e.g., first button 22) as moving the window 16 into the open configuration, as described herein, thus the gate 10 will not operate until the window 16 is in the down or open position.

If the window 16 is disposed entirely within the gate 10 (FIG. 2), the gate 10 can be moved from the closed configuration to the open configuration. Here, the second button 22 can be operated. Operating of the second button 22 can cause the actuator 154 of the latch receiver 152 to operate, releasing the latch 150 from the receiver members 156 of the latch receiver 152. In other words, operating the button 22 operates the latch receiver 152 to release the latch 150. The first and second actuators 82 and 84 then pivot the gate 10 in the forward direction. The gate 10 rotates until the second surface 44 of the gate 10 is supported by the floor 18. As described herein, the second surface 44 of the gate 10 is supported by the ribs 34, which support the gate 10 above the latches 30 in the floor 18.

The second surface 44 of the gate 10 in this position is planar with the surface S of the bed of the cargo area CR. This configuration extends the surface S of the cargo area CR.

To close the gate 10 the reverse process can be performed. That is, the second button 22 can be activated. The activation of the second button 22 causes the first and second actuators 82 and 84 to rotate the gate 10 in the rearward direction. The gate 10 approaches the opening 12 in the wall 14 and as the latch 150 is received within the receiver members 156 of the latch receiver 152, the actuator 154 of the latch receiver 152 operates to latch the latch 150 within the latch receiver 152. As can be understood the latch receiver 152 is configured to pull the latch 150 into the receiver members 156 of the latch receiver 152 and lock or fix the gate 10 within the opening 12 of the wall 14. In this configuration, the gate 10 and the wall 14 provide a separation or a barrier between the cabin area CB and the cargo area CR. In one embodiment, the gate 10 can include a sensor 182 to prevent closing on an object. The sensor 182 can be a pinch sensor as is known in the art. The actuator 62 for the window 16 can then be activated using the first button and the window 16 can move into the closed configuration fully sealing the cabin from the outside and the cargo area CR.

It can be understood, that one button, or multiple buttons can be used to operate the gate 10, the window 16 and the latch receiver 152. Moreover, the button and/or buttons can be located on the center stack CS, on a the wall 14, in a remote device (key fob KF) and/or in any suitable position or a plurality of suitable positions.

Figure 26:
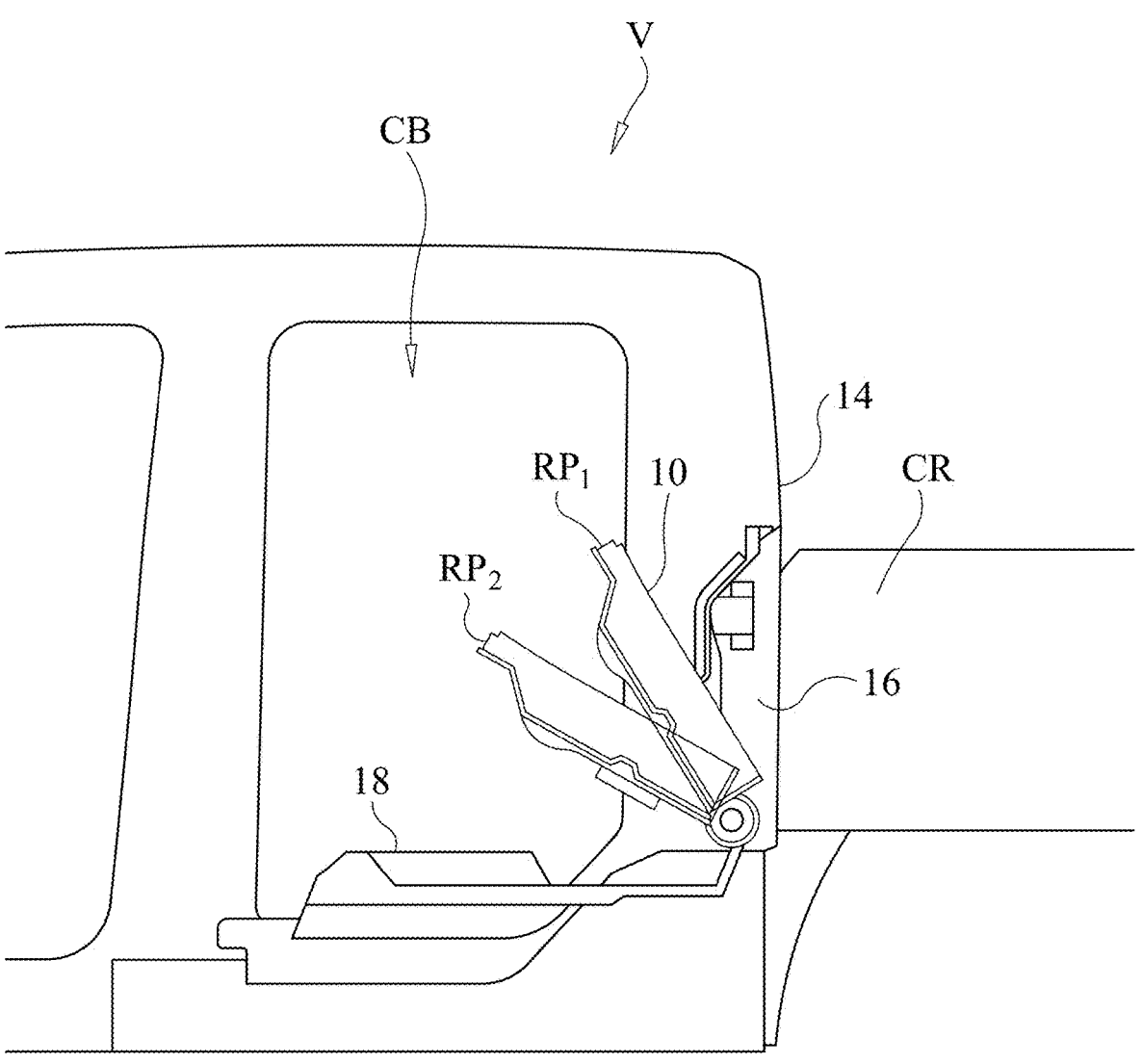
FIG. 26 is a side view of the positioned for the removable process of the gate.
Figure 27:
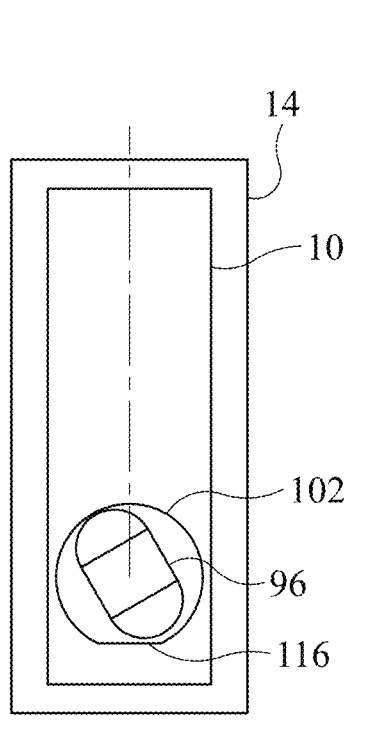
FIG. 27 is a schematic view of the right side of the gate coupled to the protrusion on the actuator.
Figure 28:
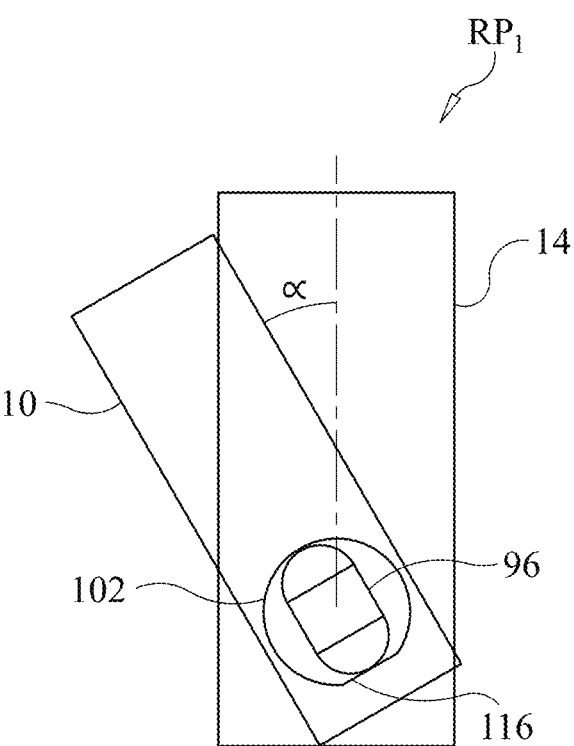
FIG. 28 is a schematic view of the right side of the gate coupled to the protrusion on the actuator in the removable position.
Figure 29:
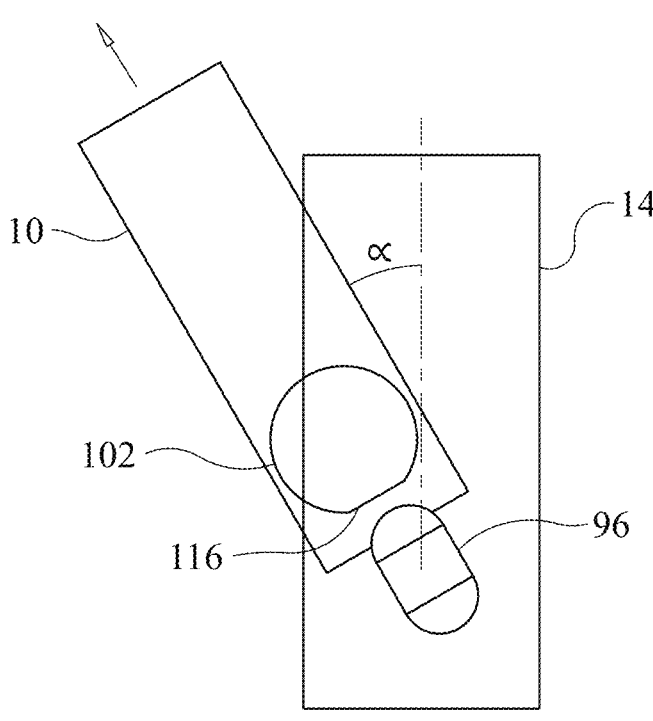
FIG. 29 is a schematic view of the right side of the gate being removed from the protrusion on the actuator.

As illustrated in FIGS. 26-33, in one embodiment, the gate 10 can be easily removed to perform maintenance or simply to provide additional room within the cabin area CB. FIG. 26 illustrates the closed configuration of the gate 10, the first (or right side) removal position $RP_1$ and the second (or left side) $RP_2$ removal position of the gate. 10. As discussed herein, the first hinge 86 includes a first cup-shaped portion 102 having the circumferential gap 116 at a first orientation. In one embodiment, the circumferential gap 116 is disposed at a 30 degree angle, as shown in FIGS. 27-29. The first actuator 82 includes the longitudinal protrusion 96 that is configured to fit within the first cup-shaped portion 102. The longitudinal protrusion 96 has a width that enables the protrusion 96 to pass through the circumferential gap 116 at the appropriate configuration.

As can be understood, while the first actuator 82 engages the first hinge 86 and moves the first hinge 86 to move the gate 10, the protrusion 96 remains stationary relative to the first hinge 86. Thus, due to the longitudinal configuration of the protrusion 96, the protrusion 96 is only removable when positioned such that the length of the protrusion 96 aligns with the circumferential gap 116 in the cup. See for example, FIG. 27, in which the gate 10 is in the closed position and the protrusion 96 is offset relative to the circumferential gap 116 in the first cup-shaped portion 102. To remove the gate 10, the gate 10 is rotated in a forward direction of the vehicle V to a location between the open configuration and the closed configuration, e.g., first removal position $RP_1$, as shown in FIG. 28. Here, the gate 10 is moved to a first angle $\alpha$ of 10-30 degrees. Once the gate 10 is at the first angle $\alpha$, the protrusion 96 aligns with the circumferential gap 116 in the first cup-shaped portion 102 and the right side of the gate 10 can be removed, as illustrated in FIG. 29.

Figure 30:
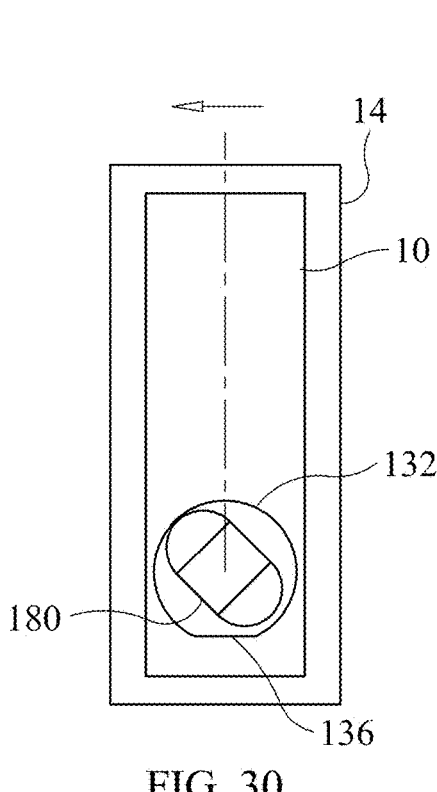
FIG. 30 is a schematic view of the left side of the gate coupled to the protrusion on the actuator.
Figure 31:
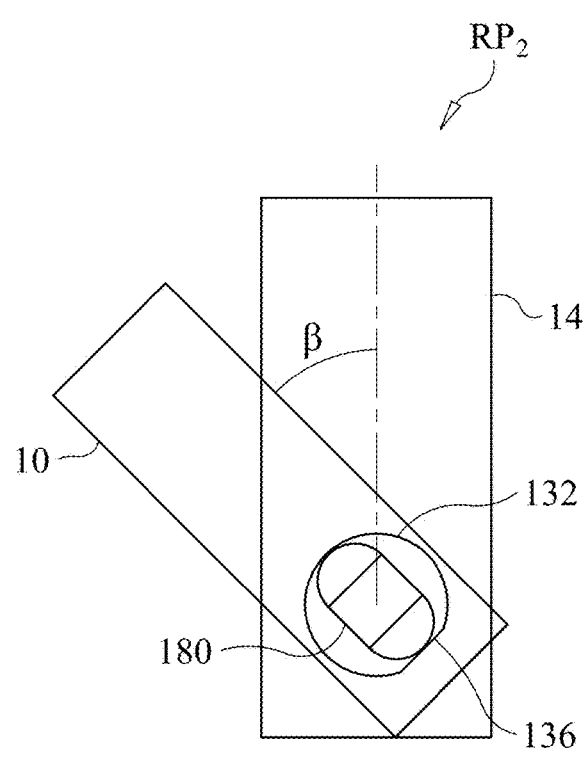
FIG. 31 is a schematic view of the left side of the gate coupled to the protrusion on the actuator in the removable position.
Figure 32:
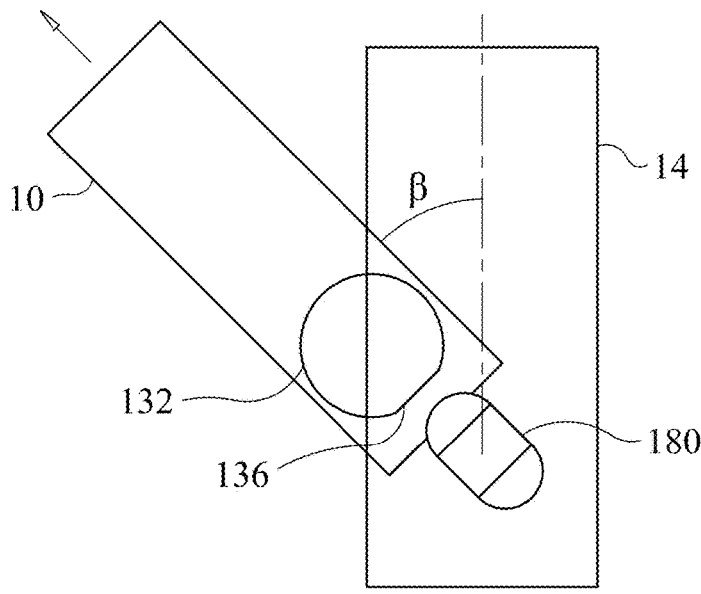
FIG. 32 is a schematic view of the left side of the gate being removed from the protrusion on the actuator.

As discussed herein, the second hinge 88 includes a second cup-shaped portion 132 having the circumferential gap 136 at a first orientation. In one embodiment, the circumferential gap 136 is disposed at a 45 degree angle, as shown in FIGS. 30-32. The second actuator 84 includes the longitudinal protrusion 180 that is configured to fit within the second cup-shaped portion 132. The longitudinal protrusion 180 has a width that enables the protrusion 180 to pass through the circumferential gap 136 at the appropriate configuration.

As can be understood, while the second actuator 84 engages the second hinge 88 and moves the second hinge 88 to move the gate 10, the protrusion 180 remains stationary relative to the second hinge 88. Thus, due to the longitudinal configuration of the protrusion 180, the protrusion 180 is only removable when positioned such that the length of the protrusion 180 aligns with the circumferential gap 136 in the second cup-shaped portion 132. See for example, FIG. 30, in which the gate 10 is in the closed position and the protrusion 180 is offset relative to the circumferential gap 136 in the second cup-shaped portion 132. To remove the gate 10, the gate 10 is rotated in a forward direction of the vehicle V to a location between the open configuration and the closed configuration, e.g., second removal position RP2, as shown in FIG. 31. Here, the gate 10 is moved to a second angle $\beta$ of 45-90 degrees. Once the gate 10 is at the second angle $\beta$, the protrusion 180 aligns with the circumferential gap 136 in the second cup-shaped portion 132 and the left side of the gate 10 can be removed, as illustrated in FIG. 32.

Figure 33:
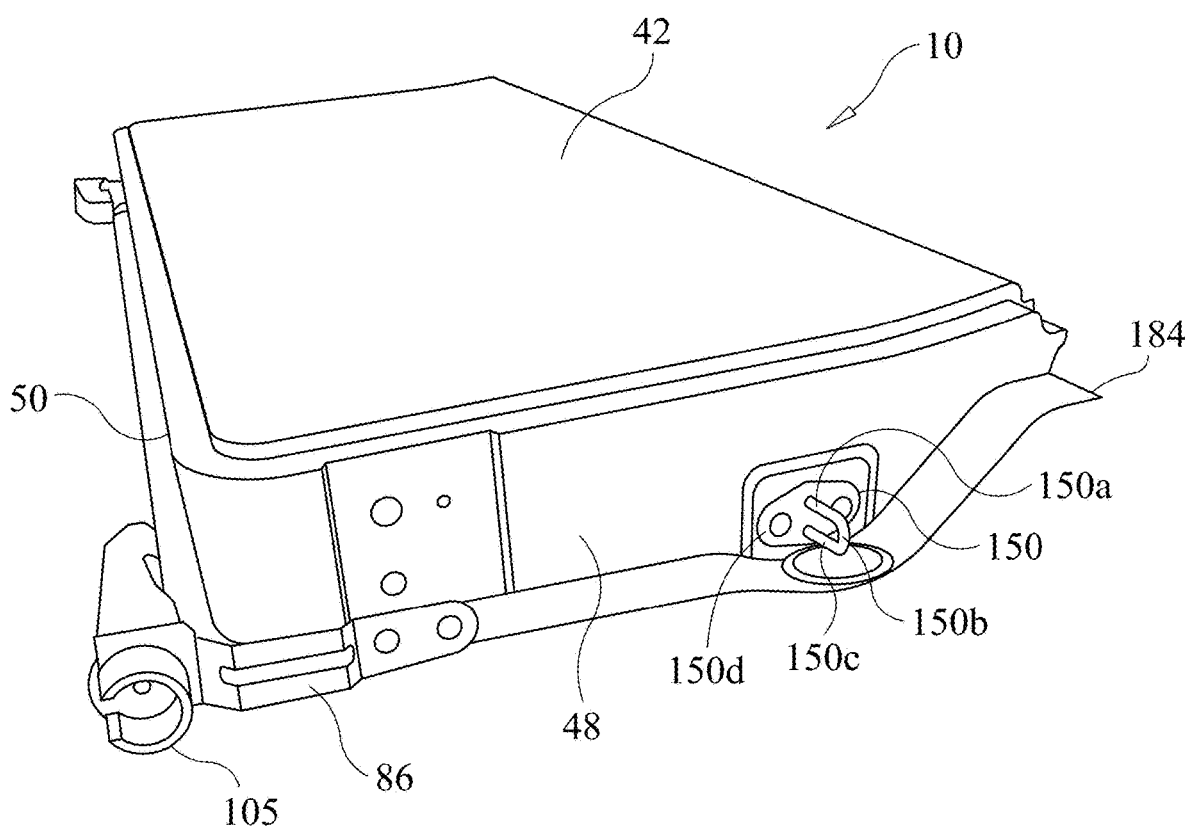
FIG. 33 shows the gate removed from the vehicle.

The gate 10 can be completely removed from the vehicle V, as illustrated in FIG. 33, enabling increased area in the cabin and/or increased area in the cargo area CR. Moreover, any maintenance to the gate 10 or the cabin area CB of the vehicle V can be easily performed.

As can be understood, the first hinge 86 is attached to the first actuator 82 at a first rotational orientation (protrusions 96 at angle $\alpha$), and the second hinge 88 is attached to the second actuator 84 at a second rotational orientation (protrusion 180 at angle $\beta$), the first rotational orientation being different from the second rotational orientation. This configuration enables the first side of the gate 10 to be removable at the first angle $\alpha$ and the second side being removable at the second angle 3, the second angle $\beta$ being different from the first angle $\alpha$. In one embodiment, the first angle $\alpha$ is between about 10-30 degrees relative to a vertical position and the second angle $\beta$ is between about 35-70 degrees relative to the vertical position. That is, as the gate 10 reaches the first angle $\alpha$, the first side of the gate 10 can be removed. As the gate 10 reaches the second angle $\beta$, the second side of the gate 10 can be removed. By requiring the gate 10 to have the first and second sides of the gate 10 be removed at different angles, the gate 10 is unlikely to be accidentally removed by a user. However, the first angle $\alpha$ and the second angle $\beta$ can be the same or can be any suitable angle that would facilitate removal of the gate 10.

The actuators are conventional components that are well known in the art. Since the actuators are well known in the art, these structures will not be discussed or illustrated in detail herein. Rather, it will be apparent to those skilled in the art from this disclosure that the components can be any type of structure and/or programming that can be used to carry out the present disclosure.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle V equipped with the gate 10 for a vehicle V. Accordingly, these terms, as utilized to describe the present disclosure should be interpreted relative to a vehicle V equipped with the gate 10 for a vehicle V.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present disclosure, it will be apparent to those skilled in the art from this disclosure that various changes and modifications can be made herein without departing from the scope of the disclosure as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further disclosures by the applicant, including the structural and/or functional concepts embodied by such feature(s). Thus, the foregoing descriptions of the embodiments according to the present disclosure are provided for illustration only, and not for the purpose of limiting the disclosure as defined by the appended claims and their equivalents.

What is claimed is:

1. A vehicle comprising:
   a cabin area;
   a cargo area;
   a gate disposed between the cabin area and the cargo area, the gate including a left side surface, a right side surface and a top surface, the gate having a closed configuration disposed in an opening in a wall separating the cabin area and the cargo area and an open configuration disposed within the cabin area, the gate including a striker latch located on the left side surface or the right side surface; and
   a latch receiver disposed in the wall separating the cabin area and the cargo area, the latch receiver including a receiver actuator and a receiver member configured to receive and lock the striker latch to fix the gate in the closed configuration.

2. The vehicle according to claim 1, wherein in the closed configuration a gap is disposed between the wall and the gate, and a lateral flange extends from the gate to cover the gap.

3. The vehicle according to claim 2, wherein the flange is disposed at a cabin side of the gate.

4. The vehicle according to claim 2, wherein the flange has an upper end and a lower end, the upper end being wider than the lower end, and a gate actuator configured to move the gate between the closed configuration and the open configuration is attached to a floor of the cabin area by a bracket, the upper end being outboard of the bracket, the lower end being inboard of the bracket.

5. The vehicle according to claim 1, wherein the latch receiver is configured to be operated remotely by an electronic switch.

6. The vehicle according to claim 1, further comprising a gate actuator configured to move the gate between the closed configuration and the open configuration.

7. The vehicle according to claim 6, wherein the gate actuator and the latch receiver are powered from a same electric supply.

8. The vehicle according to claim 6, wherein the latch receiver is aligned vertically above the gate actuator at a coupling between the gate actuator and the gate.

9. The vehicle according to claim 1, wherein the gate has an opening in a lower portion, and an electric supply passes from the wall through the opening in the lower portion and into the gate to power a movable transparent member.

10. The vehicle according to claim 1, further comprising a pinch sensor configured to prevent the gate from reaching the closing configuration.

11. The vehicle according to claim 1, wherein in the open configuration a surface on the gate is configured to be generally planar with a surface of a bed of the cargo area.

12. The vehicle according to claim 1, wherein the gate is configured to contact ribs on a surface of the cabin area in the open configuration.

13. A method of latching a gate of a vehicle, comprising:
   providing a gate between a cabin area of a vehicle and a cargo area of the vehicle, the gate including a left side surface, a right side surface and a top surface, the gate having a striker latch located on the left side surface or the right side surface and a closed configuration and an open configuration;
   providing a wall separating the cabin area and the cargo area, the wall including an opening to receive the gate and a latch receiver including a receiver actuator and a receiver member configured to receive and lock the striker latch to fix the gate in the closed configuration;
   rotating the gate in a rearward direction of the vehicle so as to locate the gate within the opening; and
   receiving the striker latch in the latch receiver to fix the gate within the opening.

14. The method according to claim 13, wherein in the closed configuration a gap is disposed between the wall and the gate, and a lateral flange extends from the gate to cover the gap.

15. The method according to claim 14, wherein the flange is disposed at the cabin side of the gate.

16. The method according to claim 13, further comprising remotely operating the latch receiver by an electronic switch.

17. The method according to claim 13, further comprising moving the gate between the closed configuration and the open configuration with a gate actuator.

18. The method according to claim 17, further comprising powering the gate actuator and the latch receiver from the same electric supply.

19. The method according to claim 18, wherein the gate has an opening in a lower portion, and a same electric supply passes from the wall through the lower opening and into the gate to power a movable transparent member.

20. The method according to claim 13, further comprising activating a pinch sensor to prevent the gate from reaching the closing configuration.

* * * * *